United States Patent [19]
Schmidt et al.

[11] Patent Number: 5,558,595
[45] Date of Patent: Sep. 24, 1996

[54] ONE-MODE, INPUT-SPLIT, PARALLEL, HYBRID TRANSMISSION

[75] Inventors: Michael R. Schmidt; Donald Klemen, both of Carmel, Ind.

[73] Assignee: General Motors Corporation, Detroit, Mich.

[21] Appl. No.: 390,186

[22] Filed: Feb. 17, 1995

[51] Int. Cl.$^6$ .................................................. B60K 41/06
[52] U.S. Cl. ............................................................ 477/3
[58] Field of Search ................................. 477/2, 3; 475/5

[56] References Cited

U.S. PATENT DOCUMENTS

| | | | |
|---|---|---|---|
| 3,566,717 | 3/1971 | Berman et al. | 477/3 |
| 3,799,284 | 3/1974 | Hender | 477/3 |
| 3,861,484 | 1/1975 | Joslin | 475/5 |
| 4,153,128 | 5/1979 | Heitmeyer et al. | 477/3 |
| 4,233,858 | 11/1980 | Rowlett | 477/3 |
| 4,354,144 | 10/1982 | McCarthy | 477/3 |
| 5,343,970 | 9/1994 | Severinsky | 475/5 |

*Primary Examiner*—Dirk Wright
*Attorney, Agent, or Firm*—Donald F. Scherer

[57] ABSTRACT

A one-mode, input-split, parallel, hybrid transmission for a vehicle has an input shaft which receives power from the vehicle engine, and an output shaft which delivers power to drive the vehicle. First and second motor/generators are employed, as are energy storage units, such as batteries, for accepting power from, and supplying power to, the first and second motor/generators. A control unit regulates power flow between the energy storage units and the motor/generators as well as between the first and second motor/generators. A planetary gear set has an inner gear member and an outer gear member, each of which meshingly engage a plurality of planet gear members. The input shaft is operatively connected to one of the gear members in the planetary gear set, and the output shaft is operatively connected to one of the other of the gear members in the planetary gear set. The first motor/generator is operatively connected to the remaining gear member in the planetary gear set, and the second motor/generator is in continuous, operative connection with the output shaft.

8 Claims, 12 Drawing Sheets

ONE-MODE, INPUT-SPLIT, PARALLEL, HYBRID TRANSMISSION

TECHNICAL FIELD

The present invention relates generally to vehicular transmissions. More particularly, the present invention relates to a vehicular transmission that is capable of receiving input power from either an engine, a source of stored electrical energy, or both. Specifically, the present invention relates to a one-mode, input-split, parallel, hybrid, vehicular transmission that utilizes a planetary gear set that is operatively connected to an engine and a motor/generator, as well as an output shaft of the transmission. A second motor/generator is operatively connected to the transmission output shaft.

BACKGROUND OF THE INVENTION

Public concern about air quality and the federal air laws have created a large demand for low emission vehicles. One form of a low emission vehicle is an electric vehicle, and the first electric powered vehicles employed transmissions that received power from a source of stored electrical energy, such as a battery. Energy from the battery powered an electric motor which, in turn, drove the wheels of the vehicle through a transmission. When the charge on the battery was expended, there was no more energy available to move the vehicle, and the vehicle could not move on its own until the battery was recharged. In order to extend the range of such vehicles, an engine and a generator were incorporated to convert a fossil fuel into electrical energy. Typically, the engine would drive the generator, and the resulting electrical energy was directed either to the battery, so that it might be recharged, or to one or more electrical motors that could assist in driving the vehicle wheels. This type system is designated as a series hybrid propulsion system.

In short, a series hybrid system is a system in which energy follows a path from an engine to a battery and then to an electrical motor which applies power to rotate the wheels. There is no mechanical path between the engine and the wheels in a series hybrid propulsion system.

Series hybrid propulsion systems for vehicles are generally designed with a low power engine for minimum emissions and high fuel economy. Such systems are inefficient when the vehicle requires high average power output or operates at continuous constant speeds. Moreover, high efficiency is not available when the vehicle is required to climb steep grades or when the vehicle must sustain high average cruising speeds. It is also recognized that the series hybrid transmission requires sizable motor/generators and must be available in a wide variety of motor sizes that are individually acceptable for specific vehicle weights and loads. The challenge is to provide a power system that will operate at high efficiencies over a wide variety of operating conditions.

Desirable electric variable transmissions should leverage the benefits of a series hybrid transmission for desirable low average power duty cycles—i.e.: low speed start/stop duty cycles—and a parallel hybrid for high average power, high speed duty cycles.

SUMMARY OF THE INVENTION

It is, therefore, a primary object of the present invention to furnish a hybrid transmission that provides the desired high efficiency sought for continuous constant speed operation and high average power applications.

It is another object of the present invention to furnish a hybrid transmission, as above, that provides the desired high efficiency sought for continuous constant speed operation and high average power applications.

It is also an object of the present invention to furnish a hybrid transmission, as above, that provides improved performance in the start/stop portions of a vehicles' duty cycle.

It is a further primary object of the present invention to furnish a hybrid transmission, as above, that provides not only higher efficiency in constant speed (low power) operation but also, by virtue of the parallel configuration, requires less cooling.

It is yet another object of the present invention to provide a hybrid transmission, as above, that allows operation under purely electrical power to achieve improved operation in urban areas or, alternatively, to achieve improved operation under conditions that require maximum stealth.

It is a still further object of the present invention to furnish a hybrid transmission, as above, that may utilize a smaller motor for a given maximum output torque requirement.

It is still another object of the present invention to provide a hybrid transmission, as above, which maximizes power density to be received in existing military or commercial vehicles that have standard drop center axles so that the suspension or the brake systems need not be re-engineered.

It is an even further object of the present invention to provide a hybrid transmission, as above, that achieves continuously variable drive ratios.

These and other objects of the invention, as well as the advantages thereof over existing and prior art forms, which will be apparent in view of the following derailed specification, are accomplished by means hereinafter described and claimed.

In general, a one-mode, input-split, parallel, hybrid electric variable transmission embodying the concepts of the present invention utilizes an input shaft to receive power from the vehicle engine and an output shaft to deliver power to drive the vehicle. First and second motor/generators are connected to energy storage units, such as batteries, so that the energy storage units can accept power from, and supply power to, the first and second motor/generators. A control unit regulates power flow between the energy storage units and the motor/generators as well as between the first and second motor/generators.

The transmission also employs at least a first planetary gear set. The planetary gear set has an inner gear member and an outer gear member, each of which meshingly engages a plurality of planet gear members. The input shaft is operatively connected to one of the gear members in the planetary gear set, and the output shaft is operatively connected to another of the gear members in the planetary gear set. The first motor/generator is connected to the remaining gear member in the planetary gear set, and the second motor/generator is in continuous, operative connection with the output shaft.

To acquaint persons skilled in the arts most closely related to the present invention, one preferred embodiment, and eight alternative embodiments, of a one-mode, input-split, parallel, hybrid electric variable transmission that illustrate the best modes now contemplated for putting the invention into practice are described herein by, and with reference to, the annexed drawings that form a pan of the specification. The exemplary embodiments of the hybrid transmission are described in detail without attempting to show all of the various forms and modifications in which the invention might be embodied. As such, the embodiments shown and described herein are illustrative, and as will become apparent to those skilled in these arts, can be modified in numerous ways within the spirit and scope of the invention; the invention being measured by the appended claims and not by the details of the specification.

DESCRIPTION OF EXEMPLARY EMBODIMENTS

Description of an exemplary, preferred embodiment

Figure 1:
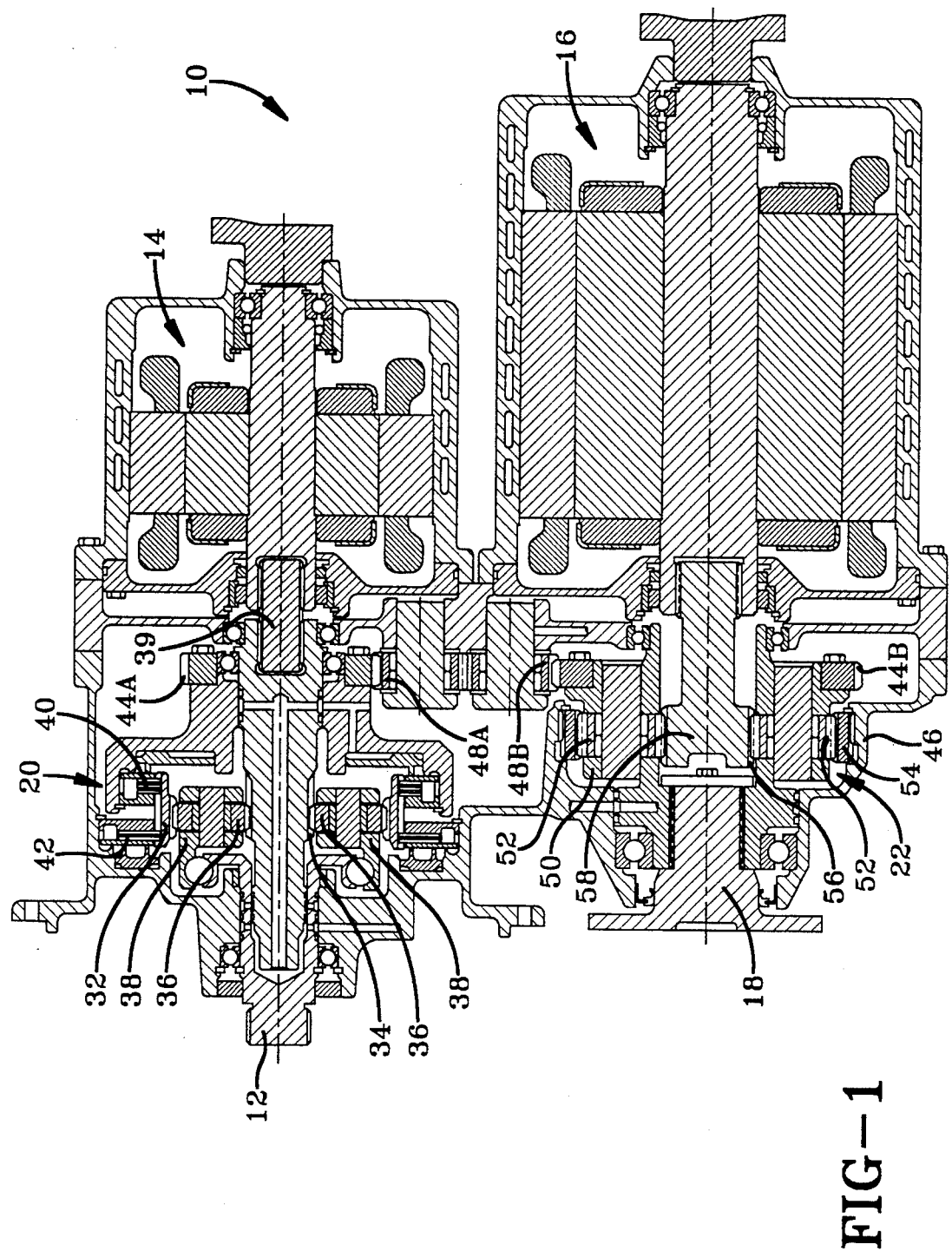
FIG. 1 is a diagrammatic, longitudinal cross section through a representative, preferred embodiment of a hybrid transmission embodying the concepts of the present invention.
Figure 2:
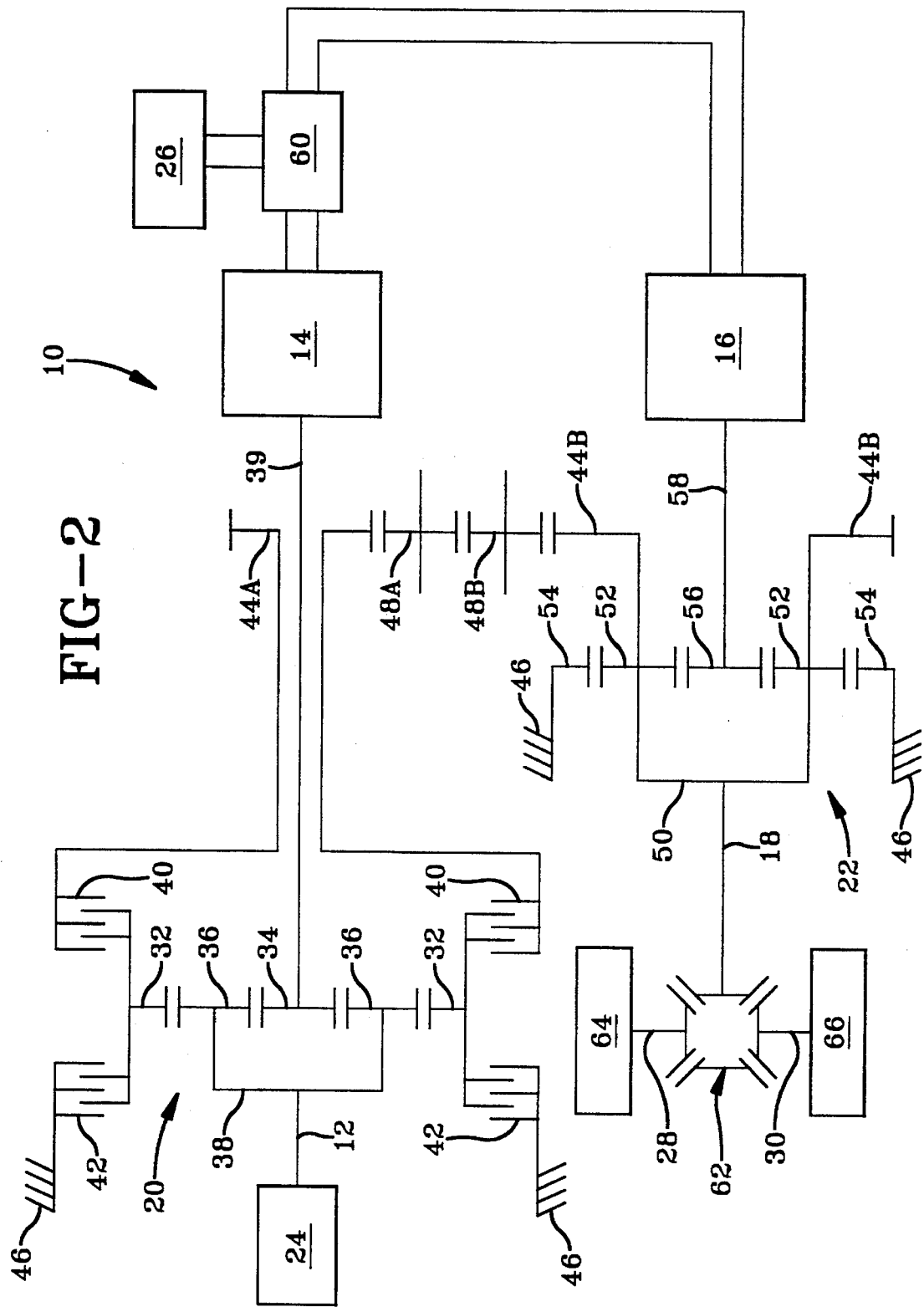
FIG. 2 is a schematic representation of the hybrid transmission depicted in FIG. 1.

One representative form of a hybrid transmission embodying the concepts of the present invention is designated generally by the numeral 10 on FIGS. 1 and 2. With particular reference to FIGS. 1 and 2, the transmission 10 has an input shaft 12, first and second motor/generators 14 and 16, respectively, an output shaft 18, and at least a first planetary gear set 20. The second motor/generator 16 is operatively connected to the output shaft 18 by a second planetary gear set 22. The hybrid transmission 10 may be utilized in a vehicle (not shown), such as a bus, that is driven by an operator.

Referring more particularly to FIG. 2, it can be seen that the hybrid transmission shown in FIG. 1 is depicted. The hybrid transmission 10 receives power from an engine 24 and an electric storage device 26. The hybrid transmission 10 can also receive feed-back power from the axles 28 and 30 of the vehicle when the vehicle is decelerating. In this exemplary embodiment, the engine 24 may be a fossil fuel engine and the electric storage device 26 may be one or more batteries. Other electric storage devices that have the ability to store electric power and dispense electric power may be used in place of the batteries without altering the concepts of the present invention.

Power from the engine 24 is introduced into the hybrid transmission 10 through an input shaft 12 that is connected to the first planetary gear set 20. Before explaining how the input shaft 12 is connected to the first planetary gear set 20, it should be understood that the first planetary gear set 20 has an outer gear member 32, generally designated as the ring gear, which circumscribes an inner gear member 34, generally designated as the sun gear. A plurality of planet gear members 36 are rotatably mounted on a carrier 38 such that each planet gear 36 meshingly engages both the outer gear member 32 and the inner gear member 34.

In the preferred embodiment of the hybrid transmission 10, the input shaft 12 is connected to the carrier 38. Thus, power from the engine 24 rotates the carrier 38 to transmit power to the outer gear member 32 and/or the inner gear member 34 through the planet gear members 36, and conversely, rotation of the carrier 38 by power applied to the planet gear members 36 from the outer gear member 32 and/or the inner gear member 34 may be absorbed back into the engine 24 through the input shaft 12. The kinetic energy generated by the momentum of the vehicle is thus fed back into the hybrid transmission through the output shaft 18.

The first motor/generator 14 is also connected to the first planetary gear set 20, as by a connecting shaft 39 that may be affixed to the inner gear member 34, as by being integrally formed therewith. The first motor/generator 14 is capable of transforming electrical power into mechanical power and transforming mechanical power into electrical power. Thus, when the first motor/generator 14 acts as a generator, the rotation of the inner gear member 34 will power the generator. When the first motor/generator 14 acts as a motor, it will drive the inner gear member 34.

The outer gear member 32 of the first planetary gear set 20 is connected to first and second torque transfer devices 40 and 42. The first torque transfer device 40 serves selectively to effect an operative connection between the outer gear member 32 and a first transfer gear 44A. The second torque transfer device 42 selectively connects the outer gear member 32 to ground, represented at 46, in order to permit the outer gear member 32 selectively to serve as the reaction member of the first planetary gear set 20. As will hereinafter be more fully described, the outer gear member 32 of the first planetary gear set 20 may be grounded when the operator desires to charge the electric storage device 26 while the vehicle is at rest. To that end the second torque transfer device 42 assures that when the vehicle is at rest, all of the power from the engine 24 will be applied directly to the first motor/generator 14.

As shown in FIG. 2, the first transfer gear 44A meshingly engages a first idler gear 48A which, in turn, meshingly engages a second idler gear 48B to provide the desired rotational direction. The second idler gear 48B meshingly engages a second transfer gear 44B presented from a carrier 50 that rotatably supports a plurality of planet gears 52 in the second planetary gear set 22. The plurality of planet gears 52 meshingly engage an outer gear member or ting gear 54 and an inner gear member or sun gear 56. The outer gear member 54 of the second planetary gear set 22 is permanently connected to ground 46, such that the outer gear member 54 acts as a permanent reaction member for the second planetary gear set 22.

The second planetary gear set 22 provides a power train or path between not only the first planetary gear set 20 and the output shaft 18, but also between the second motor/generator 16 and the output shaft 18. As previously described, the first planetary gear set 20 is connected to the carrier 50 of the second planetary gear set 22, and the output shaft 18 is operatively connected to the carrier 50. Thus, rotation of the outer gear member 32 of the first planetary gear set 20 rotates the output shaft 18. In addition, the second motor/generator 16 is connected to the inner gear member 56 of the second planetary gear set 22, as by a connecting shaft 58. Thus, when the second motor/generator 16 acts as a generator, the inner gear member 56 of the second planetary gear set 22 drives the motor/generator 16. Conversely, when the second motor/generator 16 acts as a motor, it drives the inner gear member 56 of the second planetary gear set 22. It can now be understood that the second motor/generator 16 is in continuous operative connection with the output shaft 18 by virtue of the engagement of the inner gear 56 in the second planetary gear set 22 with the plurality of planet gear members 52 supported by the carrier 50.

An electric control unit (ECU) 60 is connected to both the first and second motor/generators 14 and 16, respectively, as well as the electric storage device 26. The ECU 60 responds to a variety of input signals—including vehicle speed, operator demand, the level to which the battery is charged and the power being applied by the engine—to regulate the flow of power between the motor/generators 14 and 16 and the electric storage device 26. The ECU 60 can manipulate each motor/generator 14 and 16 to act as either a motor or a generator. The ECU 60 also regulates the flow of power into and out of the electric storage device 26.

As is also represented in FIG. 2, the output shaft 18 drives, or is driven by, the axles 28 and 30 through a differential 62. When the hybrid transmission 10 is used in a land vehicle, each axle 28 and 30 terminates in a respective wheel 64 and 66.

Operation of the exemplary preferred embodiment

Introduction

The operator of the vehicle has three primary devices to control the hybrid transmission 10. One of the primary control devices is a well known drive range selector (not shown) that directs the ECU 60 to configure the transmission for either the park, reverse, neutral, or forward drive range. The second and third primary control devices constitute an accelerator pedal (not shown) and a brake pedal (also not shown). The information obtained by the ECU 60 from these three primary control sources will hereinafter be referred to as the "operator demand". The ECU 60 also obtains information from both the first and the second motor/generators 14 and 16, respectively, the engine 24, and the electric storage device 26. In response to an operator's action, the ECU 60 determines what is required and then manipulates the components of the hybrid transmission 10 appropriately in response to the operator demand.

For example, in the exemplary embodiment shown in FIG. 2, when the operator selects a drive range and manipulates either the accelerator pedal or the brake pedal, the ECU 60 thereby determines if the vehicle should accelerate or decelerate. The ECU 60 also monitors the state of the power sources, and determines the desired rate of the acceleration or deceleration. The ECU 60 may recognize, an infinite number of acceleration and deceleration rates—from fast to slow—and in those situations where the two poles—i.e.: fast and slow—are sufficient to understand the operation of the transmission 10, only those two boundary ranges shall be discussed. On the other hand, where clarity is served by describing an intermediate range—e.g.: a medium range—a discussion of that range shall be included. As such, the ECU 60 constantly reads the operator demand in conjunction with the other information that expresses the operational state of the vehicle, including the power sources, and responds accordingly. The following descriptions describe various operational states of the hybrid transmission 10.

I. Acceleration: Both the engine and the electric storage device may provide driving power In this situation, the ECU 60 has determined that the operator desires to accelerate and that power from both the engine 24 and the electric storage device 26 is available and may be used. The ECU 60 interprets the desired rate of acceleration requested by virtue of the degree to which the operator has depressed the accelerator. If the operator demand reflects a desired slow output speed, the ECU 60 causes the first motor/generator 14 to act as a generator, drawing a portion of the power supplied by the engine 24 to recharge the electric storage device 26. The second motor/generator 16 acts as a motor, powered by both the first motor/generator 14 and the electric storage device 26.

If the operator demand reflects a desired medium output speed, both motor/generators 14 and 16 act as motors, drawing power from the electric storage device 26.

If the operator demand reflects a desired fast output speed, the second motor/generator 16 acts as a generator, drawing power from the engine 24. The first motor/generator 14 acts as a motor, drawing power from the second/motor generator 16 as well from the electric storage device 26.

II. Acceleration: The engine is to be the sole source of the driving power

In this situation, the ECU 60 has determined that the operator desires to accelerate and that the sole source of power available is from the engine 24. The ECU 60 evaluates the operator demand, and if the requested output speed is slow, the ECU 60 causes the first motor/generator 14 to act as a generator, drawing a portion of the power available from the engine 24. The second motor/generator 16 acts as a motor, powered by only the power from the first motor/generator 14.

At the other extreme, if the requested output speed is fast, the second motor/generator 16 acts as a generator, drawing a portion of the power available from the engine 24. The first motor/generator 14 acts as a motor that is powered solely by the second motor/generator 16.

III. Acceleration: The engine is not only to provide the driving power but also to charge the electric storage device In this situation, the ECU 60 has determined that the operator desires to accelerate and that power from the engine 24 will be used not only to accelerate the vehicle but also to charge the electric storage device 26. If the operator demand reflects a desired slow output speed, the ECU 60 causes the first motor/generator 14 to act as a generator, drawing a portion of the power available from the engine 24. The second motor/generator 16 acts as a motor, powered by the first motor/generator 14. The remaining power created by the first motor/generator 14 is used to charge the electric storage device 26.

If the operator demand reflects a desired medium output speed, both motor/generators 14 and 16 act as generators, drawing power from the engine 24. The electrical power produced by both motor/generators 14 and 16 is used to charge the battery 24. The mechanical power not drawn from the engine 24 by the motor/generators 14 and 16 is used to power the vehicle.

If the operator demand reflects a desired fast output speed, the second motor/generator 16 acts as a generator, drawing a portion of the mechanical power supplied by the engine 24. The first motor/generator 14 acts as a motor that is powered by the second motor/generator 16. The power from the second motor/generator 16 that is not used to run the first motor/generator 14 is directed by the ECU 60 to charge the electric storage device 26.

IV. Acceleration: The electric storage device the sole source of driving power; The engine is off In this situation, the ECU 60 has determined that the operator desires to accelerate and that the sole source of power for the acceleration must be the electric storage device 26. Irrespective of operator demand, the ECU 60 manipulates the second motor/generator 16 to act as a motor that is powered solely by the electric storage device 26. The first motor/generator 14 is idle, and the engine 24 is off.

V. Deceleration: Vehicle momentum charges the electric storage device and excess energy is absorbed by the engine In this situation, the operator demand to the ECU 60 is to decelerate, and the ECU 60 has determined that the power developed by the momentum of the vehicle will, in part, be utilized to charge the electric storage device 26 and will, in part, be absorbed by the engine 24. The ECU 60 also interprets, by the degree to which the brake pedal is deflected, the rate of deceleration desired.

If the operator demand reflects a desired fast output speed, the ECU 60 causes the first motor/generator 14 to act as a generator, receiving power fed back to the transmission 10 through the output shaft 18. The second motor/generator 16 acts as a motor that is driven by a portion of the electrical energy that is generated by the first motor/generator 14. Operation of the second motor/generator 16 as a motor, assists in driving the first motor/generator 14 as a generator. The electrical power created by the first motor/generator 14 that is not transmitted to drive the second motor/generator 16 is used to charge the electric storage device 26. Only that portion of the power fed back to the transmission 10 by the output shaft 18 that is not used to power the first motor/generator 14 is absorbed by the engine 24.

If the operator demand to the ECU 60 is to decelerate and the ECU 60 interprets, also by the degree to which the brake pedal is deflected, that the operator desires a medium output speed, the ECU 60 causes both of the motor/generators 14 and 16 act as generators. The power produced by both motor/generators 14 and 16 is used to charge the electric storage device 26. The power not drawn by the motor/ generators 14 and 16 is absorbed by the engine 24.

If the operator demand reflects a desired slow output speed, the second motor/generator 16 acts as a generator powered by a portion of the power fed back to the transmission 10 by the output shaft 18. In this situation, the first motor/generator 14 acts as a motor powered by a portion of the power created by the second motor/generator 16. The remaining power created by the second motor/generator 16 is used to charge the electric storage device 26. The feedback power delivered by the output shaft 26 to the transmission 10 that is not used to power the second motor/ generator 16, as well as the power produced by the first motor/generator 14, is absorbed by the engine 24.

VI. Deceleration: The momentum of the vehicle is absorbed solely by the engine

In this situation, the operator demand to the ECU 60 is to decelerate, and the ECU 60 has determined that the power developed by the momentum of the vehicle fed back to the transmission 10 through the output shaft 18 will be absorbed solely by the engine 24. Here, too, the ECU 60 interprets, by the degree to which the brake pedal is deflected, the rate of deceleration desired. If the operator demand reflects a desired fast output speed, the ECU 60 causes the first motor/generator 14 to act as a generator, drawing upon a portion of the power delivered to the output shaft 18 by the momentum of the vehicle. The second motor/generator 16 acts as a motor that is driven by the electrical energy created by the first motor/generator 18. The electric storage device 26 absorbs no power. On the other hand, the engine 24 absorbs not only the power created by the second motor/ generator 16 but also the remainder of the feed-back power delivered by the output shaft 18.

If the operator demand reflects a desired slow output speed, the ECU 60 causes the second motor/generator 16 to act as a generator that is operated by a portion of the power delivered to the transmission 10 by the output shaft 18. The first motor/generator 14 acts as a motor that is powered by the second motor/generator 16. Here, too, the electric storage device 26 absorbs no power, and the engine 24 absorbs the power created by the first motor/generator 14 as well as the remainder of the feed-back power delivered by the output shaft 18.

VII. Deceleration: Both the vehicle momentum and the engine charge the electric storage device In this situation, the operator demand to the ECU 60 is to decelerate, and the ECU 60 has determined that the power developed by the momentum of the vehicle and fed back to the transmission 10 through the output shaft 18 will be utilized to charge the electric storage device 26. Once again, the ECU 60 interprets, by the degree to which the brake pedal is deflected, the rate of deceleration desired. If the operator demand reflects a desired fast output speed, the ECU 60 causes the second motor/generator 16 to act as a generator. The second motor/generator will be driven, in part, by the energy delivered to the transmission 10 from the output shaft 18. The remainder of the energy required to drive the second motor/generator 16 will be provided by the engine 24. The first motor/generator 14, however, acts as a motor that is powered by a portion of the power created by the second motor/generator 16. The remaining power is used to charge the electric storage device 26.

If the operator demand reflects a desired medium or slow output speed, the ECU 60 causes both motor/generators 14 and 16 to act as generators. Both generators draw upon not only the feed-back power delivered to the transmission 10 by the output shaft 18 but also the power provided by the engine 24. All of the power created by the motor/generators 14 and 16 is used to charge the electric storage device 26.

VIII. Deceleration: All vehicle momentum is used to charge the electric storage device In this situation, the ECU 60 has determined that the operator desires to decelerate and that all the feed-back power from the vehicle will be absorbed only by the electric storage device 26. Irrespective of the rate of deceleration desired, the ECU 60 causes the second motor/generator 16 to act as a generator—drawing all of the feed-back power delivered to the output shaft 18—as well as all of the power created by the second motor/generator 16 to charge the electric storage device 26. The first motor/generator 14 is idle, and the engine 24 is off.

Description of a first alternative embodiment

Figure 3:
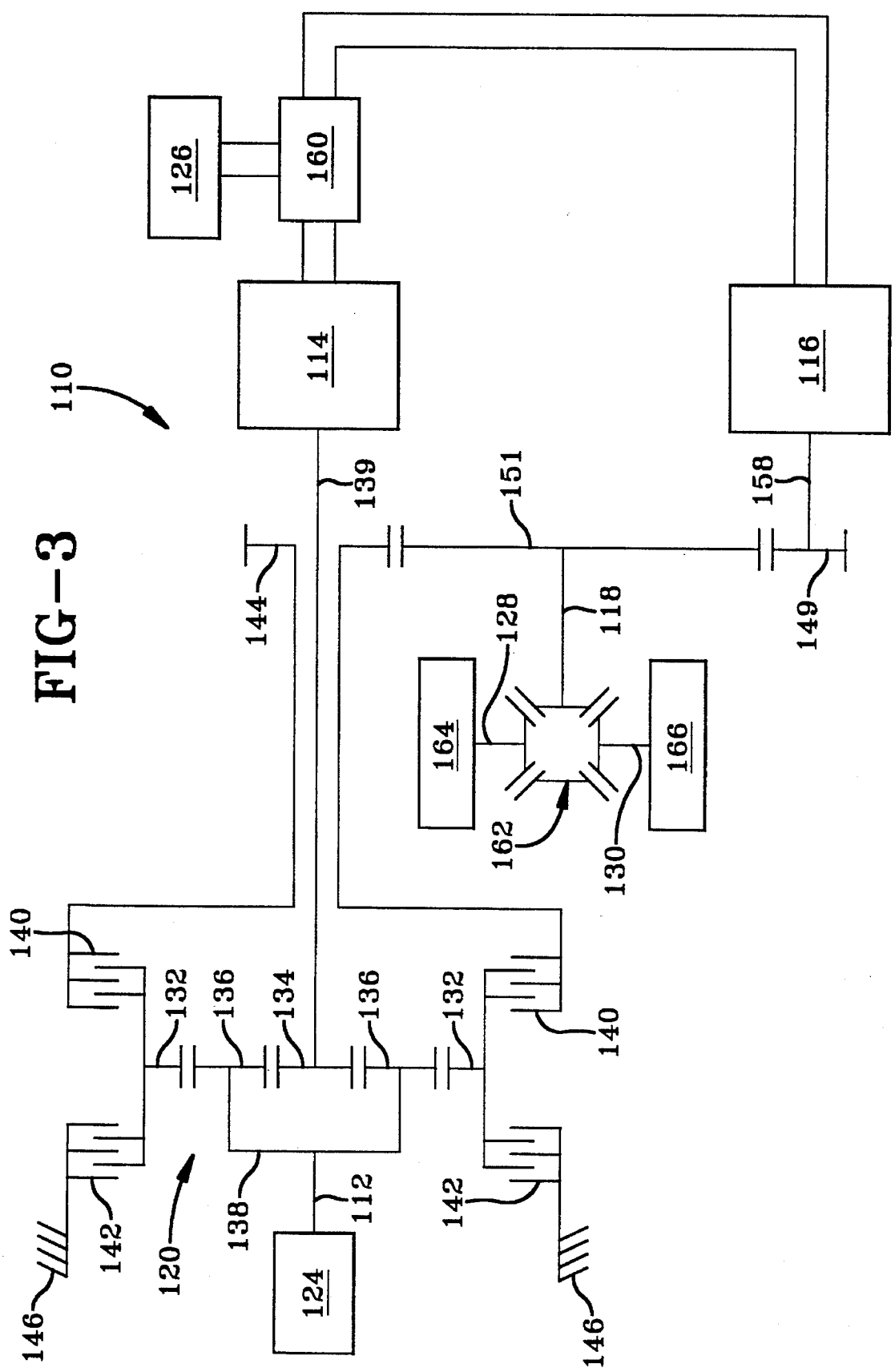
FIG. 3 is a schematic representation, similar to FIG. 2, of a first alternative embodiment of a hybrid transmission embodying the concepts of the present invention.

The first alternative form of a hybrid transmission embodying the concepts of the present invention is designated generally by the numeral 110 on FIG. 3. With particular reference, then, to FIG. 3, the transmission 110 has an input shaft 112, first and second motor/generators 114 and 116, respectively, an output shaft 118, and a first planetary gear set 120. The second motor/generator 116 is operatively connected to the output shaft 118, as, for example, in the manner hereinafter more fully described.

The hybrid transmission 110 may be utilized in a vehicle (not shown), such as a bus, that is driven by an operator. The hybrid transmission 110 receives power from an engine 124 and an electric storage device 126. The hybrid transmission 110 can also receive feed-back power from the axles 128 and 130 of the vehicle when the vehicle is decelerating. In the first alternative embodiment 110, the engine 124 may also be a fossil fuel engine, and the electric storage device 126 may be one or more batteries. Other electric storage devices that have the ability to store electric power and dispense electric power may be used in place of the batteries without altering the concepts of the present invention.

Power from the engine 124 is introduced into the hybrid transmission 110 through an input shaft 112 that is connected to the planetary gear set 120. In this first alternative embodiment, as well, the planetary gear set 120 has an outer gear member 132, generally designated as the ring gear, which circumscribes an inner gear member 134, generally designated as the sun gear. A plurality of planet gear members 136 are rotatably mounted on a carrier 138 such that each planet gear 136 meshingly engages both the outer gear member 132 and the inner gear member 134. The input shaft 112 is connected to the carrier 138. Thus, power from the engine 124 rotates the carrier 138 to transmit power to the outer gear member 132 and/or the inner gear member 134 through the planet gear members 136, and conversely, rotation of the carrier 138 by power applied to the planet gear members 136 from the outer gear member 132 and/or the inner gear member 134 may be absorbed back into the engine 124 through the input shaft 112.

The first motor/generator 114 is also connected to the planetary gear set 120, as by a connecting shaft 139 that may be affixed to the inner gear member 134. The first motor/generator 114 is capable of transforming electrical power into mechanical power and transforming mechanical power into electrical power. Thus, when the first motor/generator 114 acts as a generator, the rotation of the inner gear member 134 will power the generator. When the first motor/generator 114 acts as a motor, it will drive the inner gear member 134.

The outer gear member 132 of the planetary gear set 120 is connected to first and second torque transfer devices 140 and 142. The first torque transfer device 140 serves selectively to effect an operative connection between the outer gear member 132 and a transfer gear 144. The transfer gear 144 meshingly engages an output gear 151 that may be secured to the output shaft 118. The output gear 151 is also operatively connected to the second motor/generator 116 through a transfer gear 149 that is operatively connected to the second motor/generator 116 by virtue of a connecting shaft 158. The output gear 151 also provides the connection between the output shaft 118 and the first torque transfer device 140. As such, the second motor/generator 116 is in continuous operative connection with the output shaft 118.

The second torque transfer device 142 selectively connects the outer gear member 132 to ground, represented at 146, in order to permit the outer gear member 132 selectively to serve as the reaction member of the planetary gear set 120. The outer gear member 132 of the planetary gear set 120 is grounded when the operator desires to charge the electric storage device 126 when the vehicle is at rest. To that end the second torque transfer device 142 assures that when the vehicle is at rest, all of the power from the engine 124 to go directly to the first motor/generator 114.

An electric control unit (ECU) 160 is connected to both the first and second motor/generators 114 and 116, respectively, as well as the electric storage device 126. The ECU 160 responds to a variety of input signals, including vehicle speed, operator demand, the level to which the battery is charged, and the power being supplied by the engine, to regulate the flow of power between the motor/generators 114 and 116 and the electric storage device 126. The ECU 160 can independently manipulate each motor/generator 114 and 116 to act as either a motor or a generator. The ECU 160 also regulates the flow of power into and out of the electric storage device 126.

As represented in FIG. 3, the output shaft 118 drives, or is driven by, the axles 128 and 130 through a differential 162. When the hybrid transmission 110 is used in a land vehicle, each axle 128 and 130 terminates in a respective wheel 164 and 166.

Description of a second alternative embodiment

Figure 4:
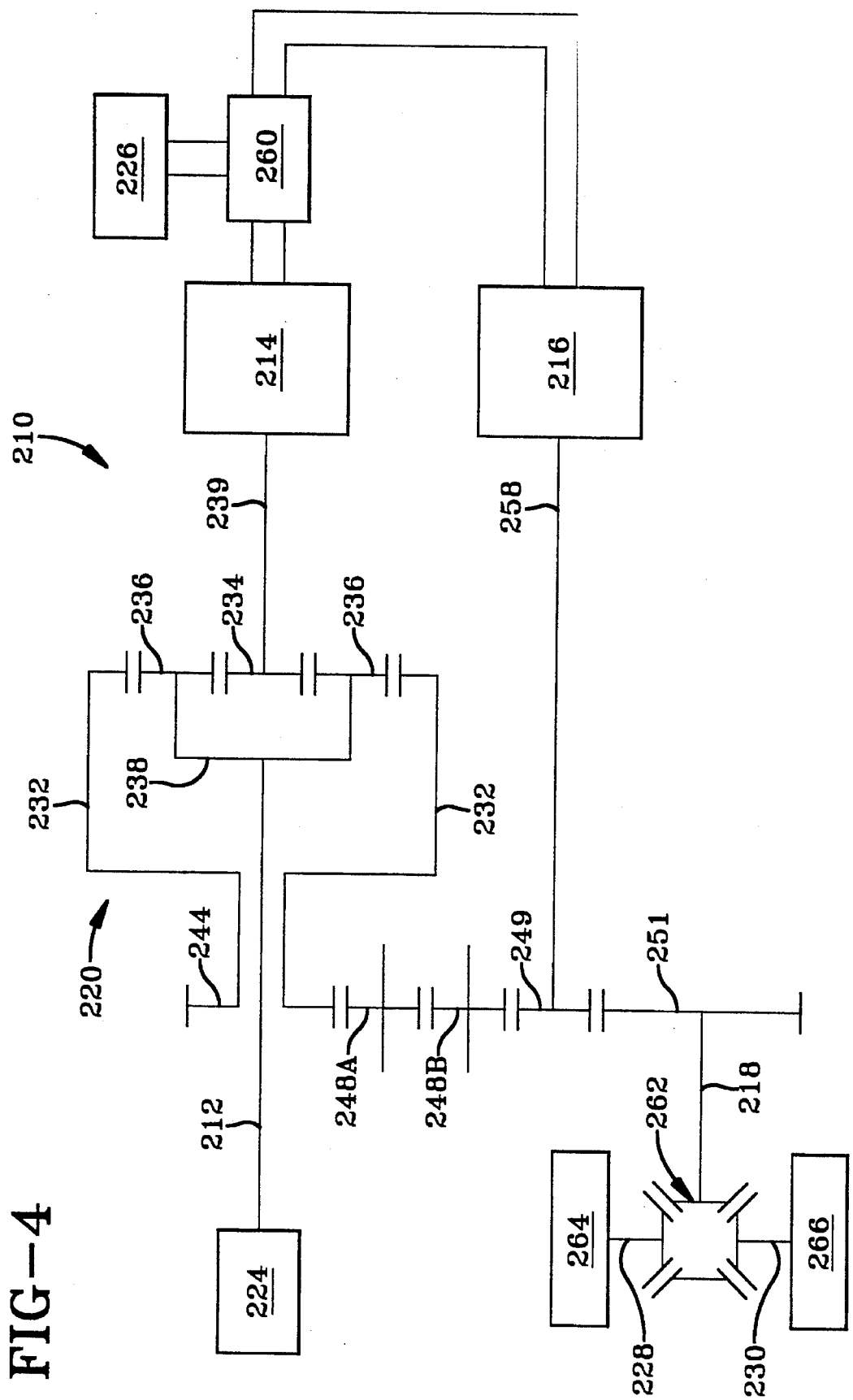
FIG. 4 is a schematic representation, similar to FIGS. 2 and 3, of a second alternative embodiment of a hybrid transmission embodying the concepts of the present invention.

The second alternative form of a hybrid transmission embodying the concepts of the present invention is designated generally by the numeral 210 on FIG. 4. With particular reference, then, to FIG. 4, the transmission 210 has an input shaft 212, first and second motor/generators 214 and 216, respectively, an output shaft 218, and a first planetary gear set 220. The second motor/generator 216 is directly connected to the output shaft 218.

The hybrid transmission 210 may be utilized in a vehicle (not shown), such as a bus, that is driven by an operator. The hybrid transmission 210 receives power from an engine 224 and an electric storage device 226. The hybrid transmission 210 can also receive feed-back power from the axles 228 and 230 of the vehicle when the vehicle is decelerating. In this exemplary embodiment, the engine 224 may also be a fossil fuel engine, and the electric storage device 226 may be one or more batteries. Other electric storage devices that have the ability to store electric power and dispense electric power may be used in place of the batteries without altering the concepts of the present invention.

Power from the engine 224 is introduced into the hybrid transmission 210 through the input shaft 212 that is connected to the first planetary gear set 220. Here, too, the first planetary gear set 220 has an outer gear member 232, generally designated as the ring gear, which circumscribes an inner gear member 234, generally designated as the sun gear. A plurality of planet gear members 236 are rotatably mounted on a carrier 238 such that each planet gear 236 meshingly engages both the outer gear member 232 and the inner gear member 234. The input shaft 212 is connected to the carrier 238. Thus, power from the engine 224 rotates the carrier 238 to transmit power to the outer gear member 232 and/or the inner gear member 234 through the planet gear members 236, and conversely, rotation of the carrier 238 by power applied to the planet gear members 236 from the outer gear member 232 and/or the inner gear member 234 may be absorbed back into the engine 224 through the input shaft 212.

The first motor/generator 214 is also connected to the first planetary gear set 220, as by a connecting shaft 239 that is fastened to the inner gear member 234. The first motor/ generator 214 is capable of transforming electrical power into mechanical power and transforming mechanical power into electrical power. Thus, when the first motor/generator 214 acts as a generator, the rotation of the inner gear member 234 will power the generator. When the first motor/generator 214 acts as a motor, it will drive the inner gear member 234.

The outer gear member 232 of the first planetary gear set 220 may, as shown, be integrally secured to the transfer gear 244. The transfer gear 244 meshingly engages a first idler gear 248A which, in turn, meshingly engages a second idler gear 248B to provide the desired rotational direction. The second idler gear 248B, in turn, meshingly engages a drive gear 249 that is directly connected to the second motor/ generator 216 by a connecting shaft 258. The drive gear 249 also meshingly engages an output gear 251 that is directly connected to the output shaft 218. It can now be understood that the second motor/generator 216 is in continuous direct connection with the output shaft 218.

An electric control unit (ECU) 260 is connected to both the first and second motor/generators 214 and 216, respectively, as well as the electric storage device 226. The ECU 260 responds to a variety of input signals, including vehicle speed, operator demand, battery charge, and engine power, to regulate the flow of power between the motor/generators 214 and 216 and the electric storage device 226. The ECU 260 can manipulate each motor/generator 214 and 216 to act as either a motor or a generator. The ECU 260 also regulates the flow of power into and out of the electric storage device 226.

As represented in FIG. 4, the output shaft 218 drives, or is driven by, the axles 228 and 230 through a differential 262. When the hybrid transmission 210 is used in a land vehicle each axle 228 and 230 terminates in a respective wheel 264 and 266.

Description of a third alternative embodiment

Figure 5:
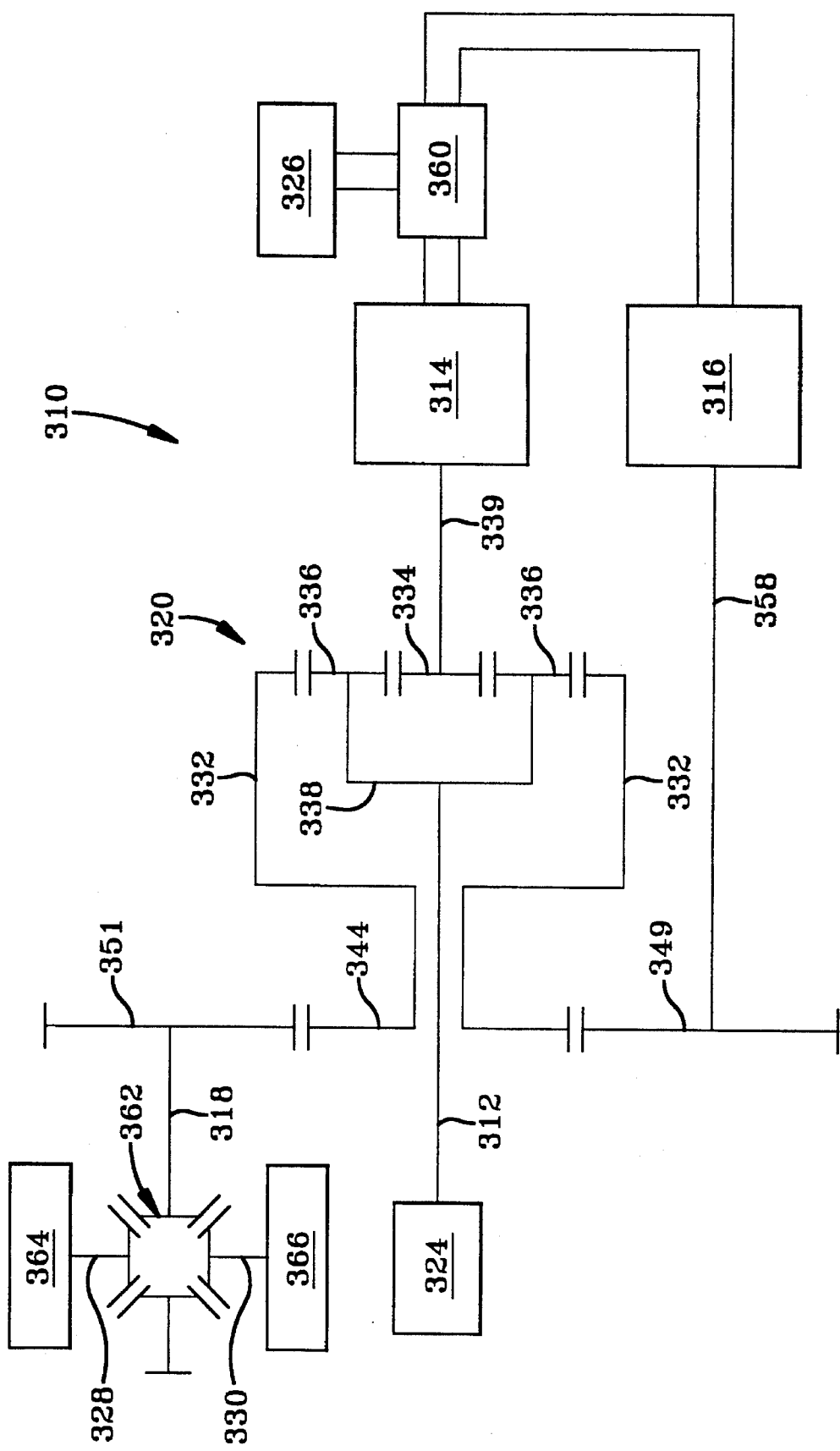
FIG. 5 is a schematic representation, similar to FIGS. 2 through 4, of a third alternative embodiment of a hybrid transmission embodying the concepts of the present invention.

The third representative form of a hybrid transmission embodying the concepts of the present invention is designated generally by the numeral 310 on FIG. 5. With particular reference, then, to FIG. 5, it will be observed that the transmission 310 has an input shaft 312, first and second motor/generators 314 and 316, respectively, an output shaft 318, and a first planetary gear set 320. The second motor/ generator 316 is directly connected to the output shaft 318.

The hybrid transmission 310 may be utilized in a vehicle (not shown), such as a bus, that is driven by an operator. The hybrid transmission 310 receives power from an engine 324 and an electric storage device 326. The hybrid transmission 310 can also receive feed-back power from the axles 328 and 330 of the vehicle when the vehicle is decelerating. In this exemplary embodiment, the engine 324 may also be a fossil fuel engine, and the electric storage device 326 may be one or more batteries. Other electric storage devices that have the ability to store electric power and dispense electric power may be used in place of the batteries without altering the concepts of the present invention.

Power from the engine 324 is introduced into the hybrid transmission 310 through the input shaft 312 that is connected to the planetary gear set 320. As in the other embodiments, the first planetary gear set 320 has an outer gear member 332, generally designated as the ring gear, which circumscribes an inner gear member 334, generally designated as the sun gear. A plurality of planet gear members 336 are rotatably mounted on a carrier 338 such that each planet gear 336 meshingly engages both the outer gear member 332 and the inner gear member 334. The input shaft 312 is connected to the carrier 338. Thus, power from the engine 324 rotates the carrier 338 to transmit power to the outer gear member 332 and/or the inner gear member 334 through the planet gear members 336, and conversely, rotation of the carrier 338 by power applied to the planet gear members 336 from the outer gear member 332 and/or the, inner gear member 334 may be absorbed back into the engine 324 through the input shaft 312.

The first motor/generator 314 is also connected to the first planetary gear set 320, as by a connecting shaft 339 that may be affixed to the inner gear member 334. The first motor/ generator 314 is capable of transforming electrical power into mechanical power and transforming mechanical power into electrical power. Thus, when the first motor/generator 314 acts as a generator, the, rotation of the inner gear member 334 will power the generator. When the first motor/ generator 314 acts as a motor, it will drive the inner gear member 334.

The outer gear member 332 of the first planetary gear set 320 is operatively connected to the second motor/generator 316. Specifically, a transfer gear 344 may be integrally formed on the outer gear member 332 meshingly to engage a drive gear 349 that is driven by a connecting shaft 358 which extends outwardly from the second motor/generator 316. The transfer gear 344 also meshingly engages an output gear 351 that may be directly connected to the output shaft 318.

An electric control unit (ECU) 360 is connected to both the first and second motor/generators 314 and 316, respectively, as well as the electric storage device 326. The ECU 360 responds to a variety of input signals, including vehicle speed, operator demand, battery charge, and engine power, to regulate the flow of power between the motor/generators 314 and 316 and the electric storage device 326. The ECU 360 can manipulate each motor/generator 314 and 316 to act as either a motor or a generator. The ECU 360 also regulates the flow of power into and out of the electric storage device 326.

As represented in FIG. 5, the output shaft 318 drives, or is driven by, the axles 328 and 330 through a differential 362. When the hybrid transmission 310 is used in a land vehicle, each axle 328 and 330 terminates in a respective wheel 364 and 366.

Description of a fourth alternative embodiment

Figure 6:
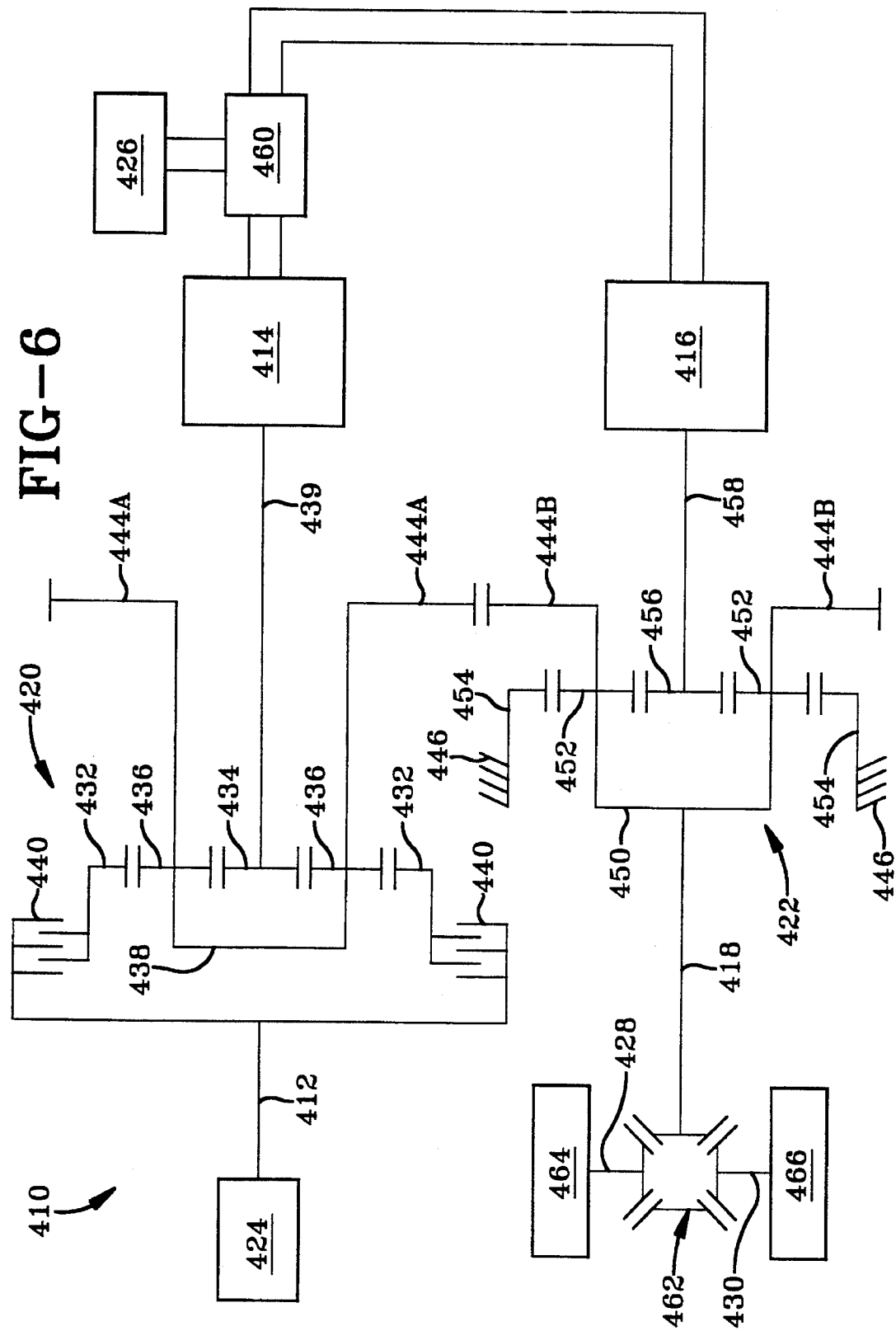
FIG. 6 is a schematic representation, similar to FIGS. 2 through 5, of a fourth alternative embodiment of a hybrid transmission embodying the concepts of the present invention.

The fourth alternative form of a hybrid transmission embodying the concepts of the present invention is designated generally by the numeral 410 on FIG. 6. With particular reference, then, to FIG. 6, the transmission 410 has an input shaft 412, first and second motor/generators 414 and 416, respectively, an output shaft 418, and at least a first planetary gear set 420. The second motor/generator 416 is operatively connected to the output shaft 418 by a second planetary gear set 422.

The hybrid transmission 410 may be utilized in a vehicle (not shown), such as a bus, that is driven by an operator. The hybrid transmission 410 receives power from art engine 424 and an electric storage device 426. The hybrid transmission 410 can also receive feed-back power from the axles 428 and 430 of the vehicle when the vehicle is decelerating. In this exemplary embodiment, the engine 424 may be a fossil fuel engine, and the electric storage device 426 may be one or more batteries. Other electric storage devices that have the ability to store electric power and dispense electric power may be used in place of the batteries without altering the concepts of the present invention.

Power from the engine 424 is introduced into the hybrid transmission 410 through the input shaft 412 that is connected to the first planetary gear set 420. The first planetary gear set 420 also has an outer gear member 432, generally designated as the ring gear, which circumscribes an inner gear member 434, generally designated as the sun gear. A plurality of planet gear members 436 ate rotatably mounted on a carrier 438 such that each planet gear 436 meshingly engages both the outer gear member 432 and the inner gear member 434.

In the fourth alternative embodiment of the hybrid transmission 410, the input shaft 412 is connected to the outer gear member 432 of the first planetary gear set 420 by a torque transfer device 440. When the torque transfer device 440 is engaged, power from the engine 424 rotates the outer gear member 432 to transmit power to the planet gear members 436, and conversely, rotation of the outer gear member 432 may be absorbed back into the engine 424 through the input shaft 412.

The first motor/generator 414 is also connected to the first planetary gear set 420, as by a connecting shaft 439 that may be affixed to the inner gear member 434. The first motor/generator 414 is capable of transforming electrical power into mechanical power and transforming mechanical power into electrical power. Thus, when the first motor/generator 414 acts as a generator, the rotation of the inner gear member 434 will power the generator. Conversely, when the first motor/generator 414 acts as a motor, it will drive the inner gear member 434.

In the fourth alternative embodiment, a first transfer gear 444A may be integrally secured to the carrier 438 of the first planetary gear set 420 meshingly to engage a second transfer gear 444B that may be integrally secured to a carrier 450 that rotatably supports a plurality of planet gears 452 in the second planetary gear set 422. The plurality of planet gears 452 meshingly engage an outer gear member or ring gear 454, and an inner gear member or sun gear 456. The outer gear member 454 of the second planetary gear set 422 is permanently connected to ground 446 such that the outer gear member 454 acts as a permanent reaction member for the second planetary gear set 422.

The second planetary gear set 422 provides a power train between not only the first planetary gear set 420 and the output shaft 418, but also between the second motor/generator 416 and the output shaft 418. As previously described, the first planetary gear set 420 is connected to the carrier 450 of the second planetary gear set 422, and the output shaft 418 is driven by the carrier 450. Thus, rotation of the carrier 438 of the first planetary gear set 420 rotates the output shaft 418. In addition, the second motor/generator 416 is connected to the inner gear member 456 of the second planetary gear set 422, as by a connecting shaft 458. Thus, when the second motor/generator 416 acts as a generator, the inner gear member 456 of the second planetary gear set 422 drives the motor/generator 416. Conversely, when the second motor/generator 416 acts as a motor, it drives the inner gear member 456 of the second planetary gear set 422. It can now be understood that the second motor/generator 416 is in continuous operative connection with the output shaft 418 through the engagement of the inner gear 456 of the second planetary gear set 422 with the plurality of planet gear members 452 supported by the carrier 450.

An electric control unit (ECU) 460 is connected to both the first and second motor/generators 414 and 416, respectively, as well as the electric storage device 426. The ECU 460 responds to a variety of input signals, including vehicle speed, operator demand, battery charge, and engine power, to regulate the flow of power between the motor/generators 414 and 416 and the electric storage device 426. The ECU 460 can manipulate each motor/generator 414 and 416 to act as either a motor or a generator. The ECU 460 also regulates the flow of power into and out of the electric storage device 426.

As represented in FIG. 6, the output shaft 418 drives, or is driven by, the axles 428 and 430 through a differential 462. When the hybrid transmission 410 is used in a land vehicle, each axle 428 and 430 terminates in a respective drive wheel 464 and 466.

Description of a fifth alternative embodiment

Figure 7:
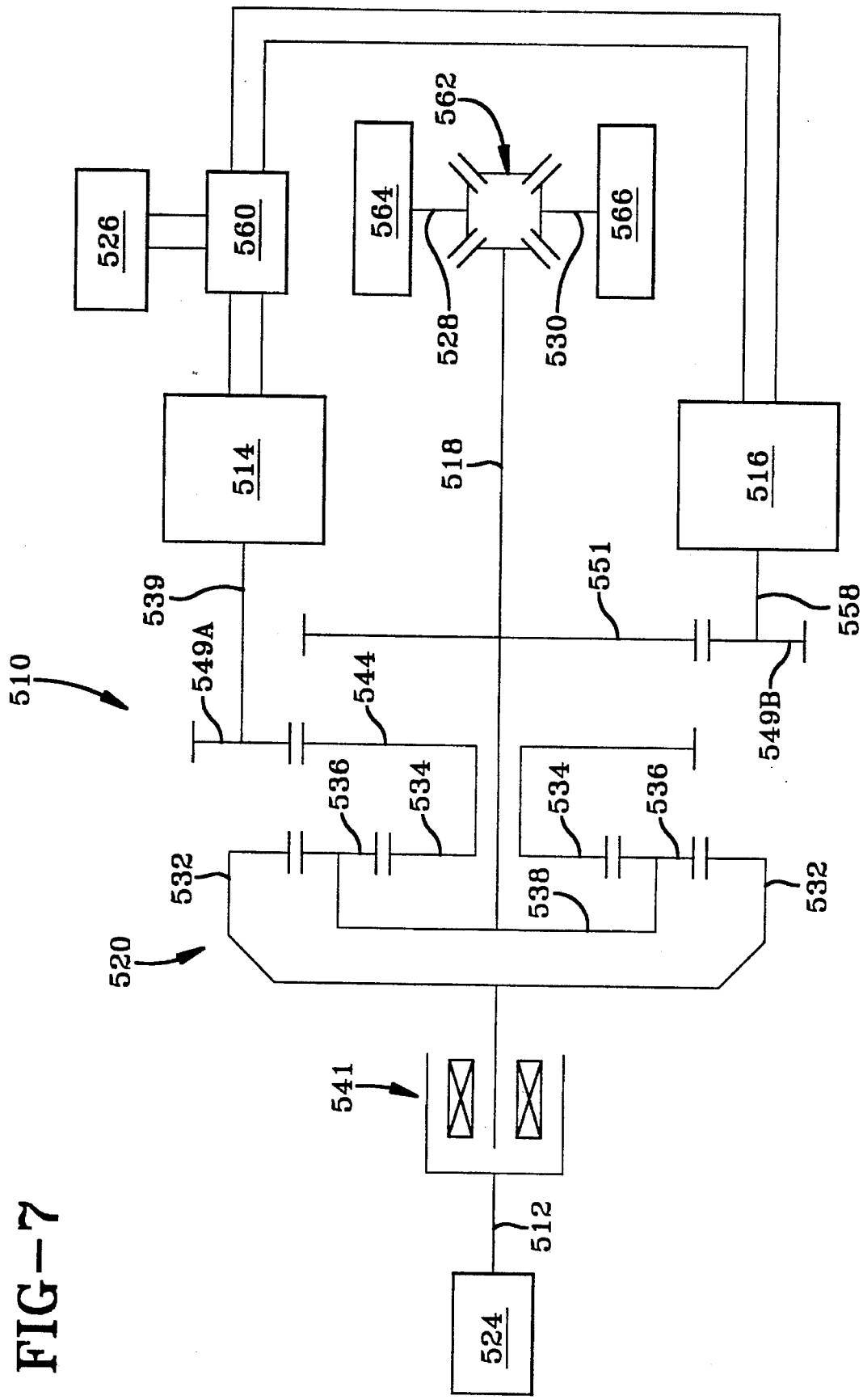
FIG. 7 is a schematic representation, similar to FIGS. 2 through 6, of a fifth alternative embodiment of a hybrid transmission embodying the concepts of the present invention.

The fifth alternative form of a hybrid transmission embodying the concepts of the present invention is designated generally by the numeral 510 on FIG. 7. With particular reference, then, to FIG. 7, the transmission 510 has an input shaft 512, first and second motor/generators 514 and 516, respectively, an output shaft 518, and a first planetary gear set 520. The second motor/generator 516 is operatively connected to the output shaft 518.

The hybrid transmission 510 may be utilized in a vehicle (not shown), such as a bus, that is driven by an operator. The hybrid transmission 510 receives power from an engine 524 and an electric storage device 526. The hybrid transmission 510 can also receive feed-back power from the axles 528 and 530 of the vehicle when the vehicle is decelerating. In this exemplary embodiment, the engine 524 may be a fossil fuel engine, and the electric storage device 526 may be one or more batteries. Other electric storage devices that have the ability to store electric power and dispense electric power may be used in place of the batteries without altering the concepts of the present invention.

Power from the engine 524 is introduced into the hybrid transmission 510 through the input shaft 512 that is operatively connected to the first planetary gear set 520. The first planetary gear set 520 has an outer gear member 532, generally designated as the ring gear, which circumscribes an inner gear member 534, generally designated as the sun gear. A plurality of planet gear members 536 are rotatably mounted on a carrier 538 such that each planet gear 536 meshingly engages both the outer gear member 532 and the inner gear member 534. The input shaft 512 is connected to the outer gear member 532 by an over-run or one way clutch 541. Thus, power from the engine 524 rotates the carrier 538 to transmit power to the outer gear member 532 and/or the inner gear member 534 through the planet gear members 536.

The first motor/generator 514 is also operatively connected to the first planetary gear set 520. Specifically, the first motor/generator 514 is operatively connected to a first drive gear 549A by a connecting shaft 539. The first drive gear 549A meshingly engages a transfer gear 544 that may be integrally secured to the inner gear member 534 The first motor/generator 514 is capable of transforming electrical power into mechanical power and transforming mechanical power into electrical power. Thus, when the first motor/generator 514 acts as a generator, the rotation of the inner gear member 534 will power the generator. When the first motor/generator 514 acts as a motor, it will drive the inner gear member 534.

The carrier 538 of the first planetary gear set 520 is directly connected to the output shaft 518. An output gear 551, which is also directly connected to the output shaft 518, also meshingly engages a second drive gear 549B that is directly connected to the second motor/generator 516 by a connecting shaft 558. Thus, rotation of the carrier 538 in the planetary gear set 520 rotates the output shaft 518 and the second motor/generator 516. As such, when the second motor/generator 516 acts as a generator, the output shaft 518 drives the motor/generator 516. Conversely, when the second motor/generator 516 acts as a motor, it drives the output shaft 518. It can now be understood that the second motor/generator 516 is in continuous operative connection with the output shaft 518 through the engagement of the second drive gear 549B with the output gear 551 on the output shaft 518.

An electric control unit (ECU) 560 is connected to both the first and second motor/generators 514 and 516, respectively, as well as the electric storage device 526. The ECU 560 responds to a variety of input signals, including vehicle speed, operator demand, battery charge, and engine power, to regulate the flow of power between the motor/generators 514 and 516 and the electric storage device 526. The ECU 560 can manipulate each motor/generator 514 and 516 to act as either a motor or a generator. The ECU 560 also regulates the flow of power into and out of the electric storage device 526.

As represented in FIG. 7, the output shaft 518 drives, or is driven by, the axles 528 and 530 through a differential 562. When the hybrid transmission 510 is used in a land vehicle, each axle 528 and 530 terminates in a respective wheel 564 and 566.

Description of a sixth alternative embodiment

Figure 8:
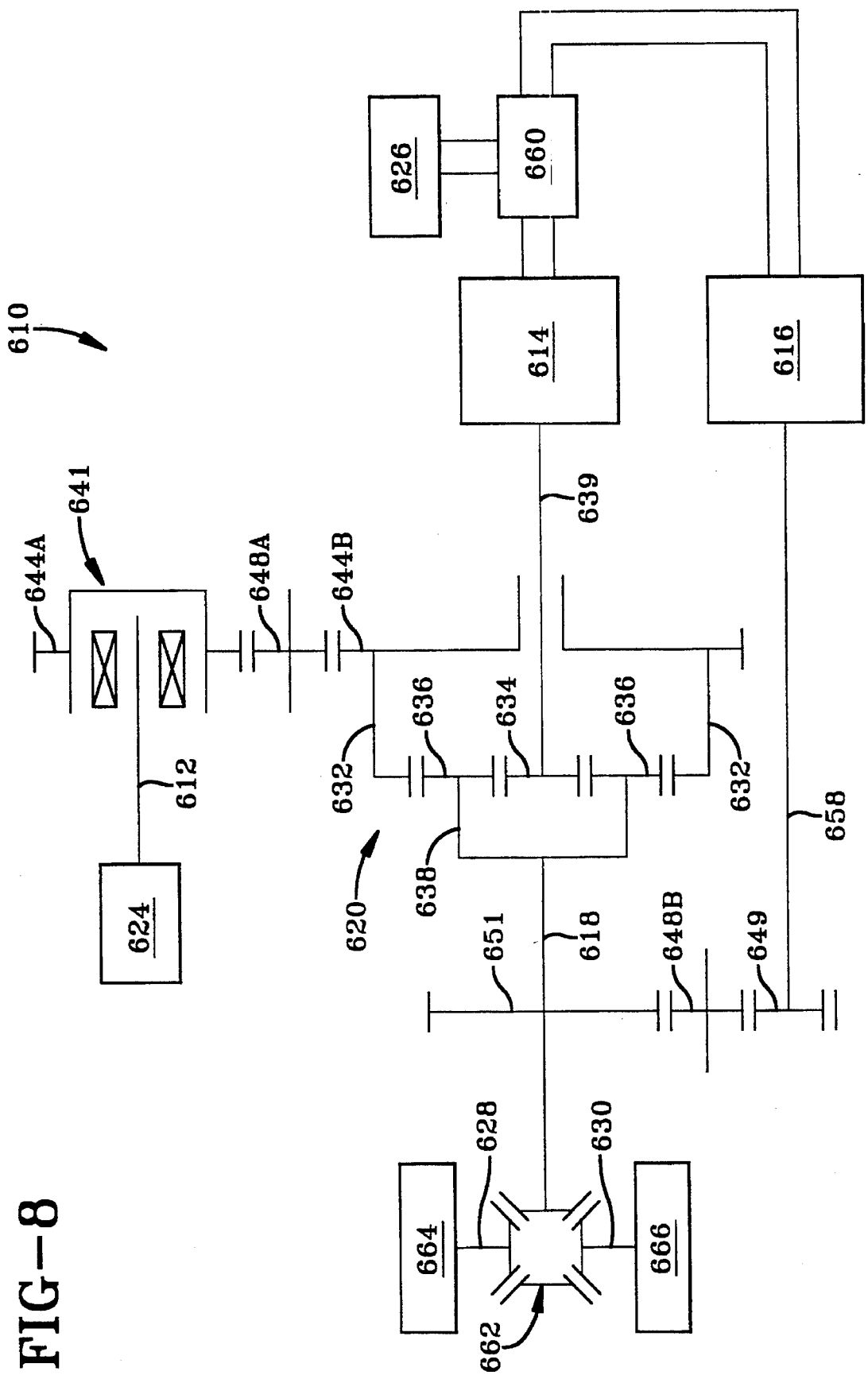
FIG. 8 is a schematic representation, similar to FIGS. 2 through 7, of a sixth alternative embodiment of a hybrid transmission embodying the concepts of the present invention.

The sixth alternative form of a hybrid transmission embodying the concepts of the present invention is designated generally by the numeral 610 on FIG. 8. With particular reference, then, to FIG. 8 the transmission 610 has an input shaft 612, first and second motor/generators 614 and 616, respectively, an output shaft 618, and a first planetary gear set 620. The second motor/generator 616 is, as will be hereinafter more fully described, in continuous operative connection with the output shaft 618.

The hybrid transmission 610 may be utilized in a vehicle (not shown), such as a bus, that is driven by an operator. The hybrid transmission 610 receives power from an engine 624 and an electric storage device 626. The hybrid transmission 610 can also receive feed-back power from the axles 628 and 630 of the vehicle when the vehicle is decelerating. As in the other exemplary embodiments previously described herein, the engine 624 may be a fossil fuel engine, and the electric storage device 626 may be one or more batteries. Other electric storage devices that have the ability to store electric power and dispense electric power may be used in place of the batteries without altering the concepts of the present invention.

Power from the engine 624 is introduced into the hybrid transmission 610 through the input shaft 612 that is operatively connected to the first planetary gear set 620 by a drive train that will be hereinafter more fully described. The first planetary gear set 620 has an outer gear member 632, generally designated as the ring gear, which circumscribes an inner gear member 634, generally designated as the sun gear. A plurality of planet gear members 636 are rotatably mounted on a carrier 638 such that each planet gear 636 meshingly engages both the outer gear member 632 and the inner gear member 634. The input shaft 612 is connected to a first transfer gear 644A by an overrun or one-way clutch 641. The first transfer gear 644A meshingly engages a first idler gear 648A which, in turn, meshingly engages a second transfer gear 644B that may be integrally secured to the outer gear member 632 of the first planetary gear set 620. Thus, power from the engine 624 rotates the outer gear member 632 to transmit power to the planet gear members 636.

The first motor/generator 614 is capable of transforming electrical power into mechanical power and, alternatively, transforming mechanical power into electrical power. In the sixth alternative embodiment, as shown in FIG. 8, the first motor/generator 614 is connected to the inner gear member 634 of the first planetary gear set 620, as by a connecting shaft 639 that is fastened to the inner gear member 634. Thus, when the first motor/generator 614 acts as a generator, the rotation of the inner gear member 634 will power the generator. When the first motor/generator 614 acts as a motor, it will drive the inner gear member 634.

The carrier 638 of the planetary gear set 620 is directly connected to the output shaft 618. Thus, rotation of the carrier 638 in the planetary gear set 620 rotates the output shaft 618. In addition, the second motor/generator 616 is in continuous operative connection with the output shaft 618. A drive gear 649 that is directly driven by the second motor/generator 616—as by the connecting shaft 658—meshingly engages a second idler gear 648B that meshingly engages an output gear 651 that is directly connected to the output shaft 618. Thus, when the second motor/generator 616 acts as a generator, the output shaft 618 drives the motor/generator 616, and when the second motor/generator 616 acts as a motor, it drives the output shaft 618. It can now be understood that the second motor/generator 616 is in continuous operative connection with the output shaft 618.

An electric control unit (ECU) 660 is connected to both the first and second motor/generators 614 and 616, respectively, as well as the electric storage device 626. The ECU 660 responds to a variety of input signals, including vehicle speed, operator demand, battery charge, and engine power, to regulate the flow of power between the motor/generators 614 and 616 and the electric storage device 626. The ECU 660 can manipulate each motor/generator 614 and 616 to act as either a motor or a generator. The ECU 660 also regulates the flow of power into and out of the electric storage device 626.

As represented in FIG. 8, the output shaft 618 drives, or is driven by, the axles 628 and 630 through a differential 662. When the hybrid transmission 610 is used in a land vehicle, each axle 628 and 630 terminates in a respective wheel 664 and 666.

Description of a seventh alternative embodiment

Figure 9:
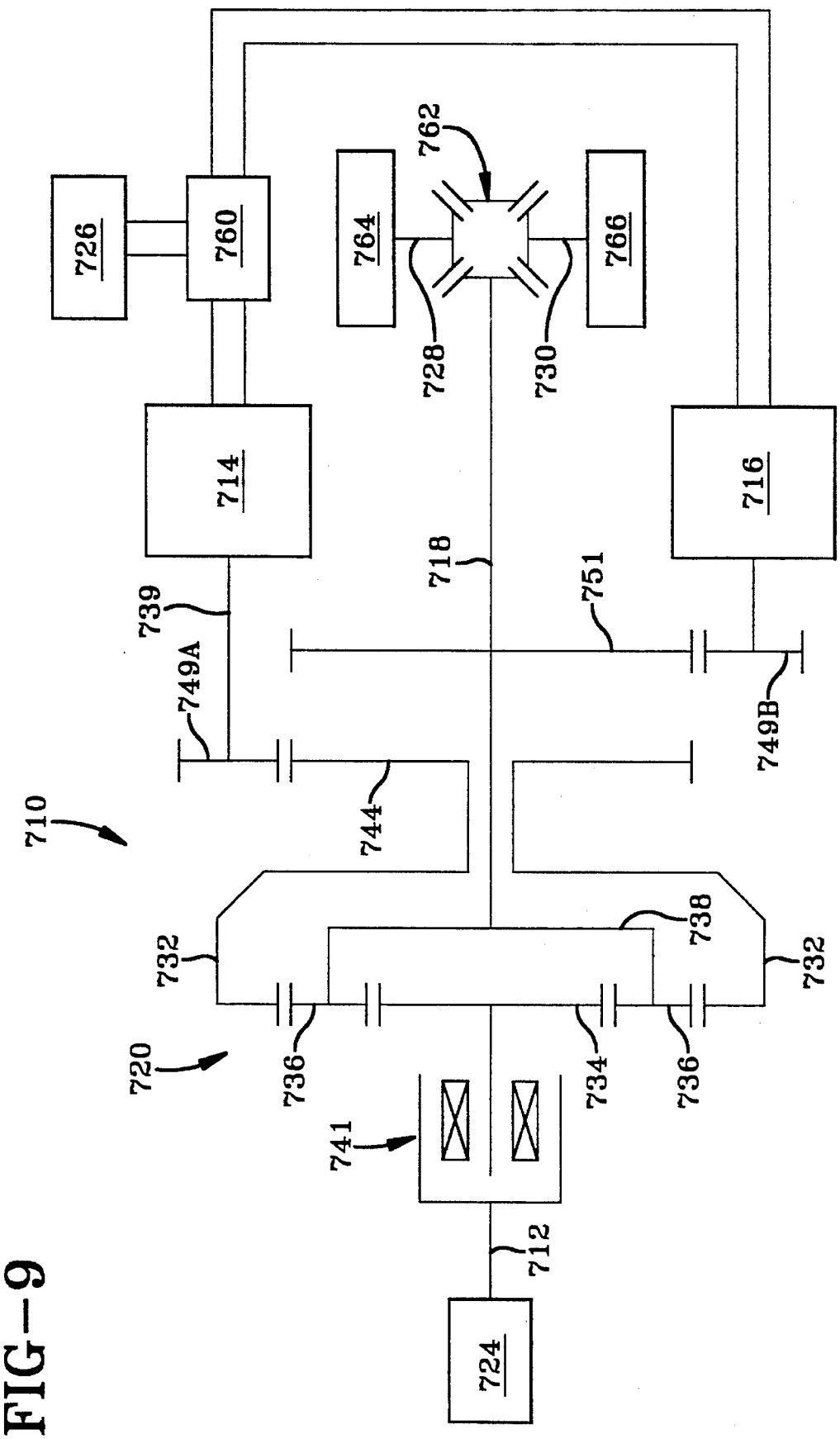
FIG. 9 is a schematic representation, similar to FIGS. 2 through 8, of a seventh alternative embodiment of a hybrid transmission embodying the concepts of the present invention.

The seventh alternative form of a hybrid transmission embodying the concepts of the present invention is designated generally by the numeral 710 on FIG. 9. With particular reference to FIG. 9, the transmission 710 has an input shaft 712, first and second motor/generators 714 and 716, respectively, an output shaft 718, and a first planetary gear set 720. The second motor/generator 716 is, as will be hereinafter more fully described, in continuous operative connection with the output shaft 718.

The hybrid transmission 710 may be utilized in a vehicle (not shown), such as a bus, that is driven by an operator. The hybrid transmission 710 receives power from an engine 724 and an electric storage device 726. The hybrid transmission 710 can also receive feed-back power from the axles 728 and 730 of the vehicle when the vehicle is decelerating. Also in the seventh exemplary embodiment, the engine 724 may be a fossil fuel engine, and the electric storage device 726 may be one or more batteries. Other electric storage devices that have the ability to store electric power and dispense electric power may be used in place of the batteries without altering the concepts of the present invention.

Power from the engine 724 is introduced into the hybrid transmission 710 through the input shaft 712 that is operatively connected to the first planetary gear set 720, as will be hereinafter more fully described. The first planetary gear set 720 has an outer gear member 732, generally designated as the ring gear, which circumscribes an inner gear member 734, generally designated as the sun gear. A plurality of planet gear members 736 are rotatably mounted on a carrier 738 such that each planet gear 736 meshingly engages both the outer gear member 732 and the inner gear member 734. The input shaft 712 is connected to the inner gear member 734 through an overran or one-way clutch 741. Thus, power from the engine 724 rotates the inner gear member 734 to transmit power to the planet gear members 736.

The first motor/generator 714 is capable of transforming electrical power into mechanical power and transforming mechanical power into electrical power. In the seventh alternative embodiment, the first motor/generator 714 is operatively connected to the outer gear member 732 of the first planetary gear set 720. That is, a first drive gear 749A that is directly connected to the first motor/generator 714, as by a connecting shaft 739, meshingly engages a transfer gear 744 that may be integrally secured to the outer gear member 732. Thus, when the first motor/generator 714 acts as a generator, the rotation of the outer gear member 732 will power the generator. With the first motor/generator 714 acting as a motor, it will drive the outer gear member 732.

The carrier 738 in the first planetary gear set 720 is directly connected to the output shaft 718. The output shaft 718 is also operatively connected to the second motor/generator 716 through the engagement of a second drive gear 749B with an output gear 751 secured to the output shaft 718. Thus, when the second motor/generator 716 acts as a generator, the output shaft 718 drives the motor/generator 716, and conversely, when the second motor/generator 716 acts as a motor, it drives the output shaft 718. It can now be understood that the second motor/generator 716 is in continuous operative connection with the output shaft 718.

An electric control unit (ECU) 760 is connected to both the first and second motor/generators 714 and 716, respectively, as well as the electric storage device 726. The ECU 760 responds to a variety of input signals, including vehicle speed, operator demand, battery charge, and engine power, to regulate the flow of power between the motor/generators 714 and 716 and the electric storage device 726. The ECU 760 can manipulate each motor/generator 714 and 716 to act as either a motor or a generator. The ECU 760 also regulates the flow of power into and out of the electric storage device 726.

As represented in FIG. 9, the output shaft 718 drives, or is driven by, the axles 728 and 730 through a differential 762. When the hybrid transmission 710 is used in a land vehicle, each axle 728 and 730 terminates in a respective wheel 764 and 766.

Description of an eighth alternative embodiment

Figure 10:
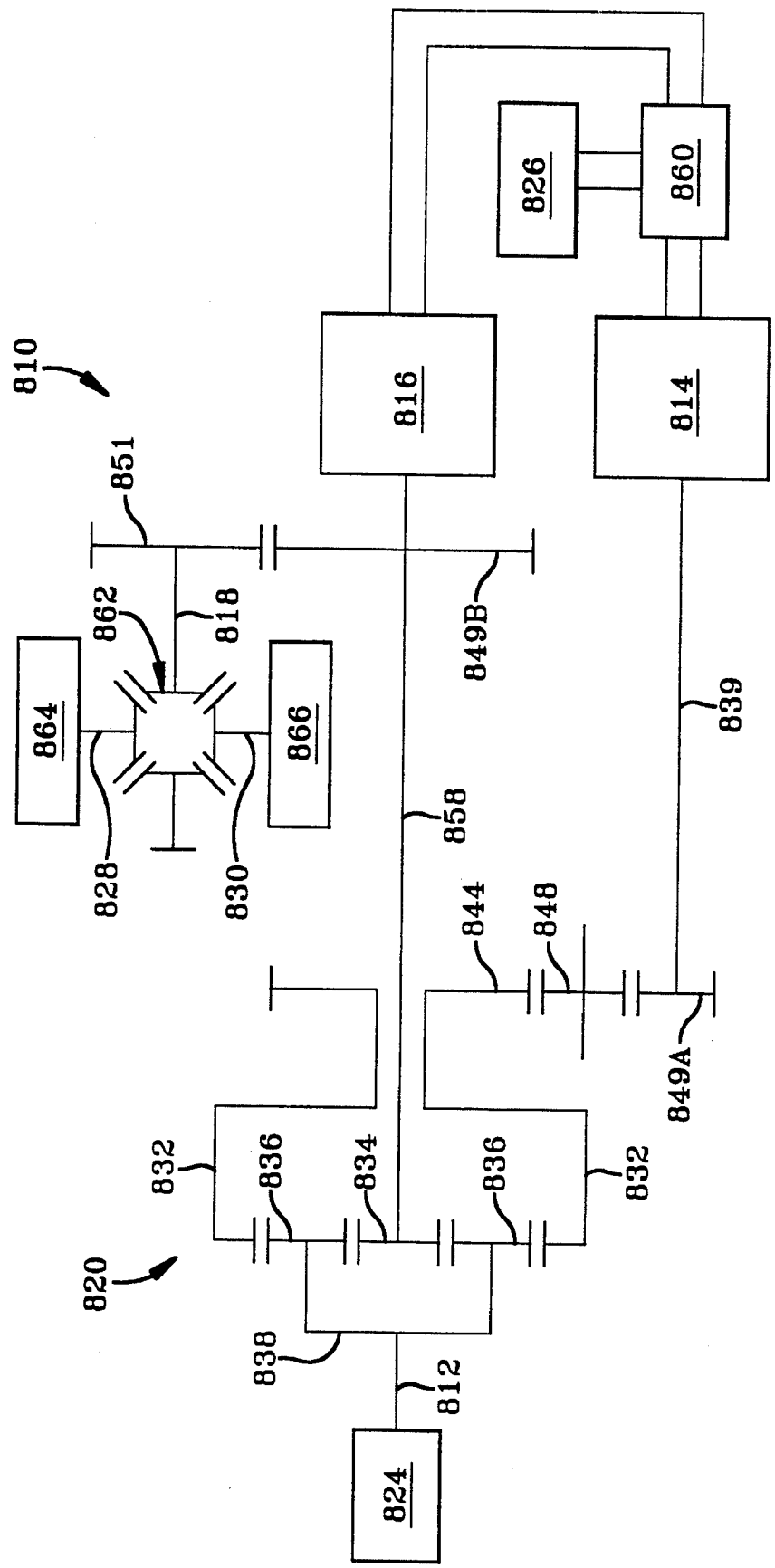
FIG. 10 is a schematic representation, similar to FIGS. 2 through 9, of an eighth alternative embodiment of a hybrid transmission embodying the concepts the present invention.

The eighth alternative form of a hybrid transmission embodying the concepts of the present invention is designated generally by the numeral 810 on FIG. 10. With particular reference, then, to FIG. 10, the transmission 810 has an input shaft 812, first and second motor/generators 814 and 816, respectively, an output shaft 818, and a first planetary gear set 820. The second motor/generator 816 is operatively connected to the output shaft 818.

The hybrid transmission 810 may be utilized in a vehicle (not shown), such as a bus, that is driven by an operator. The hybrid transmission 810 receives power from an engine 824 and an electric storage device 826. The hybrid transmission 810 can also receive feed-back power from the axles 828 and 830 of the vehicle when the vehicle is decelerating. In this exemplary embodiment, the engine 824 is a gasoline engine and the electric storage device 826 may be one or more batteries. Other electric storage devices that have the ability to store electric power and dispense electric power may be used in place of the batteries without altering the concepts of the present invention.

Power from the engine 824 is introduced into the hybrid transmission 810 through the input shaft 812. The input shaft 812 is connected to the first planetary gear set 820 in a manner that will be hereinafter more fully described. The first planetary gear set 820 has an outer gear member 832, generally designated as the ring gear, which circumscribes an inner gear member 834, generally designated as the sun gear. A plurality of planet gear members 836, are rotatably mounted on a carrier 838 such that each planet gear 836 meshingly engages both the outer gear member 832 and the inner gear member 834. The input shaft 812 is connected to the carrier 838. Thus, power from the engine 824 rotates the carrier 838 to transmit power to the outer gear member 832 and/or the inner gear member 834 through the planet gear members 836, and conversely, rotation of the carrier 838 by power applied to the planet gear members 836 from the outer gear member 832 and/or the inner gear member 834 may be absorbed back into the engine 824 through the input shaft 812. When energy is absorbed back into the engine 824, the engine 824 acts as a damper. Typically, this situation occurs when the engine 824 is not running, and the vehicle is decelerating.

The first motor/generator 814 is also operatively connected to the first planetary gear set 820. The first motor/generator 814 is capable of transforming electrical power into mechanical power and transforming mechanical power into electrical power. In the eighth embodiment, the first motor/generator 814 is operatively connected to the outer gear member 832 of the planetary gear set 820. Specifically, a first drive gear 849A that is directly connected to the first motor/generator 814, as by a connecting shaft 839, meshingly engages an idler gear 848 which, in turn, meshingly engages a transfer gear 844 that may be integrally secured to the outer gear member 832. Thus, when the first motor/generator 814 acts as a generator, the rotation of the inner gear member 834 will power the generator. With the first motor/generator 814 acting as a motor, it will drive the inner gear member 834.

The second motor/generator 816 is continuously connected to the inner gear member 834 of the first planetary gear set 820, as by a connecting shaft 858. Thus, when the second motor/generator 816 acts as a generator, the inner gear member 834 of the first planetary gear set 820 drives the motor/generator 816. Conversely, when the second motor/generator 816 acts as a motor, it drives the inner gear member 834 of the planetary gear set 820. The second motor/generator 816 is also in continuous operative connection with the output shaft 818 through the engagement of a second drive gear 849B and an output gear 851 that may be directly connected to the output shaft 818.

An electric control unit (ECU) 860 is connected to both the first and second motor/generators 814 and 816, respectively, as well as the electric storage device 826. The ECU 860 responds to a variety of input signals, including vehicle speed, operator demand, battery charge, and engine power, to regulate the flow of power between the motor/generators 814 and 816 and the electric storage device 826. The ECU 860 can manipulate each motor/generator 814 and 816 to act as either a motor or a generator. The ECU 860 also regulates the flow of power into and out of the electric storage device 826.

As represented in FIG. 10, the output shaft 818 drives, or is driven by, the axles 828 and 830 through a differential 862. When the hybrid transmission 810 is used in a land, vehicle each axle 828 and 830 terminates in a respective wheel 864 and 866.

Description of a ninth alternative embodiment

The ninth alternative embodiment utilizes the same general concepts as the previously described embodiments, except that this embodiment effects a marked reduction in the overall circumference of the transmission, and that result is obtained by virtue of the fact that all shafts rotate about a common axis 911, as will be hereinafter more fully described.

Figure 11:
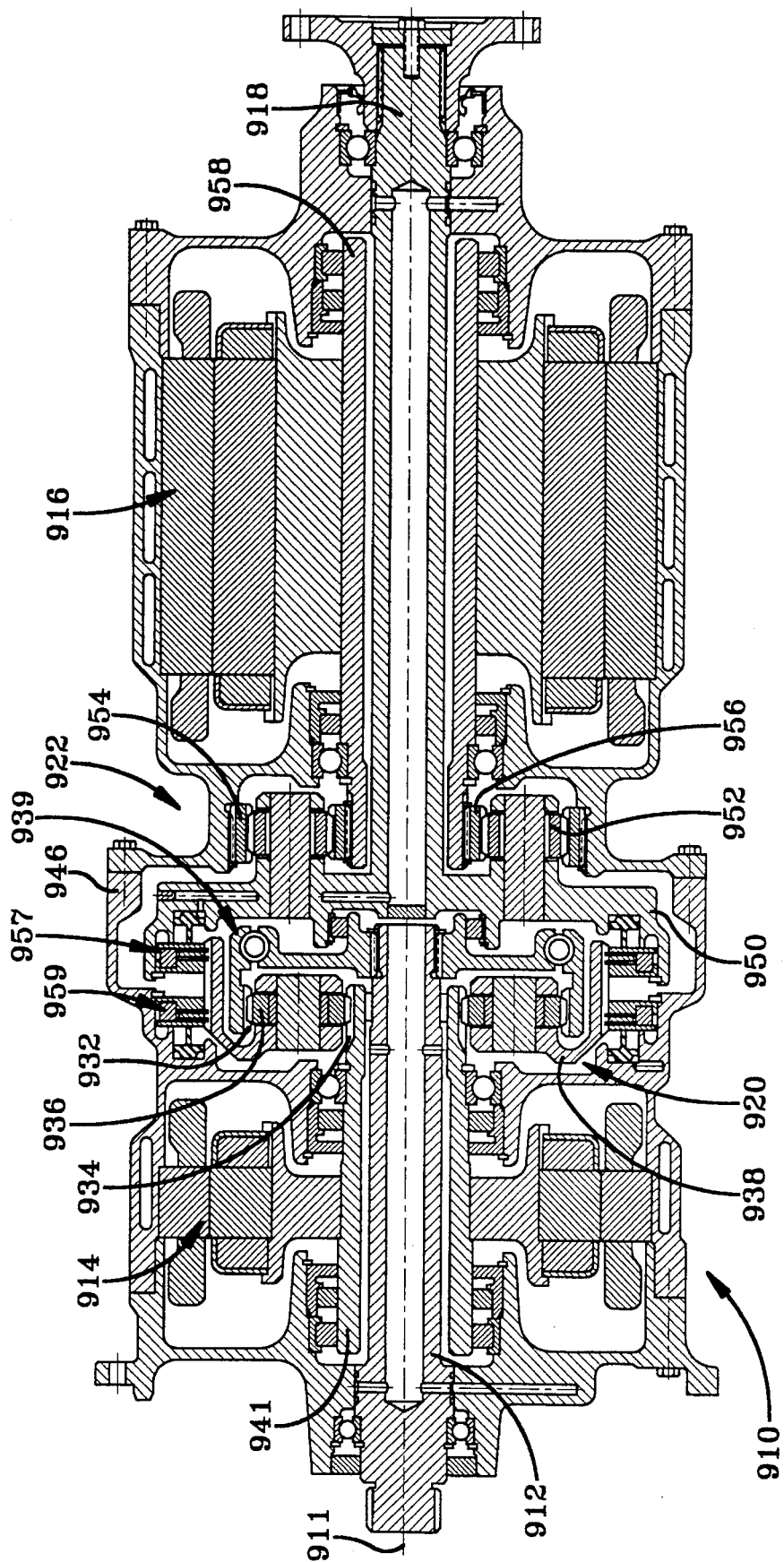
FIG. 11 is a diagrammatic, longitudinal cross section through a representative ninth alternative embodiment of a hybrid transmission embodying the concepts of the present invention.
Figure 12:
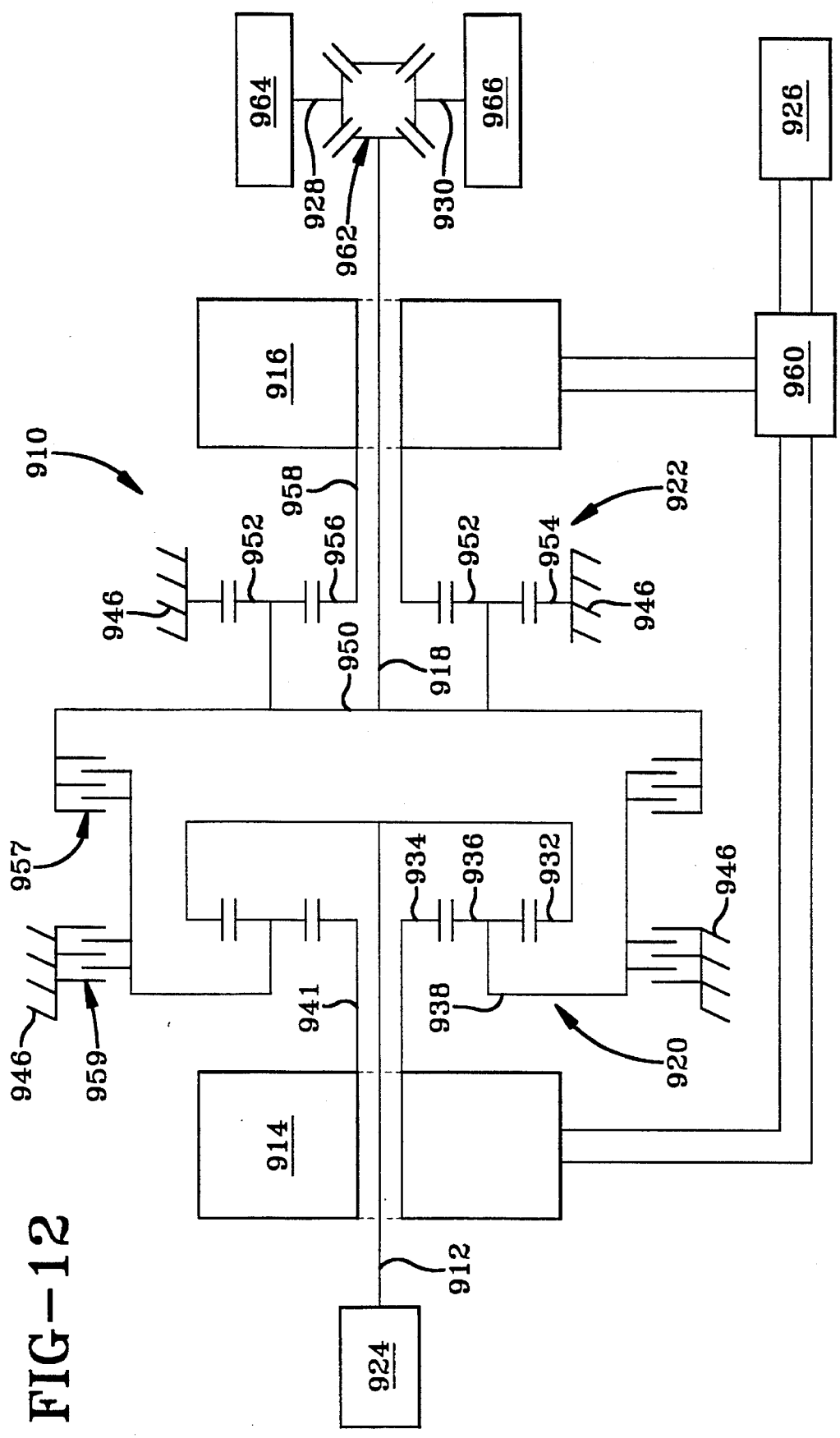
FIG. 12 is a schematic representation of a hybrid transmission depicted in FIG. 11.

The ninth alternative form of a hybrid transmission embodying the concepts of the present invention is designated generally by the numeral 910 on FIGS. 11 and 12. With particular reference, then, to FIGS. 11 and 12, the transmission 910 has an input shaft 912, first and second motor/generators 914 and 916, respectively, an output shaft 918, and at least a first planetary gear set 920. The input shaft 912 and the output shaft 918, as best seen in FIG. 11, are coincident in that they share the common axis 911. The second motor/generator 916 is operatively connected to the output shaft 918 by a second planetary gear set 922.

The hybrid transmission 910 may be utilized in a vehicle (not shown), such as a bus, that is driven by an operator. The hybrid transmission 910 receives power from an engine 924 and an electric storage device 926. The hybrid transmission 910 can also receive feed-back power from the axles 928 and 930 of the vehicle when the vehicle is decelerating. In this exemplary embodiment, the engine 924 may be a fossil fuel engine, and the electric storage device 926 may be one or more batteries. Other electric storage devices that have the ability to store electric power and dispense electric power may be used in place of the batteries without altering the concepts of the present invention.

Power from the engine 924 is introduced into the hybrid transmission 910 through the input shaft 912 that rotates about the common axis 911. The input shaft 912 is connected to one of the gear members in the first planetary gear set 920. The first planetary gear set 920 has an outer gear member 932, generally designated as the ring gear, which circumscribes an inner gear member 934, generally designated as the sun gear. A plurality of planet gear members 936 are rotatably mounted on a carrier 938 such that each planet gear 936 meshingly engages both the outer gear member 932 and the inner gear member 934. In the ninth alternative embodiment of the hybrid transmission 910, the input shaft 912 is directly connected to the outer gear member 932 of the first planetary gear set 920, as through a torsional damper 939 (FIG. 11).

The first motor/generator 914 is also connected to the first planetary gear set 920, as by a connecting sleeve shaft 941 that may be integral with, or affixed to, the inner gear member 934. In any event, the sleeve shaft 941 is coaxially disposed with respect to the input shaft 912. The first motor/generator 914 is capable of transforming electrical power into mechanical power and transforming mechanical power into electrical power. Thus, when the first motor/generator 914 acts as a generator, the rotation of the inner gear member 934 will power the generator. Conversely, when the first motor/generator 914 acts as a motor, it will drive the inner gear member 934.

In the ninth alternative embodiment, the carrier 938 of the first planetary gear set 920 is selectively connected to a carrier 950 that rotatably supports a plurality of planet gears 952 in the second planetary gear set 922. The plurality of planet gears 952 meshingly engage an outer gear member or ring gear 954 and an inner gear member or sun gear 956. The outer gear member 954 of the second planetary gear set 922 is permanently connected to ground 946, such that the outer gear member 954 acts as a permanent reaction member for the second planetary gear set 922.

The second planetary gear set 922 provides a power train between not only the first planetary gear set 920 and the output shaft 918, but also between the second motor/generator 916 and the output shaft 918. Specifically, the carrier 938 of the first planetary gear set 920 may be selectively connected to the carrier 950 of the second planetary gear set 922 through a first torque transfer device 957 which acts as a clutch. The carrier 938 is also selectively connected to ground 946 through a second torque transfer device 959, which acts as a brake. As such, the first planetary gear set 920 is selectively connected to the carrier 950 of the second planetary gear set 922, and the output shaft 918 is driven by the carrier 950. Thus, rotation of the carrier 938 of the first planetary gear set 920 may effect selective rotation of the output shaft 918.

In addition, the sleeve shaft 958, which is presented from the second motor/generator 916 and is disposed coaxially with respect to the output shaft 918, may be integral with or affixed to the inner gear member 956 of the second planetary gear set 922. Thus, when the second motor/generator 916 acts as a generator, the inner gear member 956 of the second planetary gear set 922 drives the motor/generator 916. Conversely, when the second motor/generator 916 acts as a motor, it drives the inner gear member 956 of the second planetary gear set 922. It can now be understood that the second motor/generator 916 is in continuous operative connection with the output shaft 918 through the engagement of the inner gear 956 of the second planetary gear set 922 with the plurality of planet gear members 952 supported by the carrier 950.

An electric control unit (ECU) 960 is connected to both the first and second motor/generators 914 and 916, respectively, as well as the electric storage device 926. The ECU 960 responds to a variety of input signals, including vehicle speed, operator demand, battery charge, and engine power, to regulate the flow of power between the motor/generators 914 and 916 and the electric storage device 926. The ECU 960 can manipulate each motor/generator 914 and 916 to act as either a motor or a generator. The ECU 960 also regulates the flow of power into and out of the electric storage device 926.

As represented in FIG. 6, the output shaft 918 drives or is driven by the axles 928 and 920 through a differential 962. When the hybrid transmission 910 is used in a land vehicle, each axle 928 and 930 terminates in a respective wheel 964 and 966.

Conclusion

One preferred and nine alternative embodiments of the present invention are disclosed, and it is to be clearly understood that the aforesaid embodiments are susceptible to numerous additional changes apparent to one skilled in the art. Therefore, the scope of the present invention is not to be limited to the details shown and described but is intended to include all changes and modifications which come within the scope of the appended claims.

As should now be apparent, the present invention teaches that a one- mode, input-split, parallel, hybrid transmission embodying the concepts of the present invention is capable of accomplishing the objects of the invention.

We claim:

1. A hybrid transmission comprising:

an input shaft to receive power from an engine;

an output shaft;

first and second motor/generators;

energy storage means for accepting power from, and supplying power to, said first and second motor/generators;

control means for regulating power flow between said energy storage means and said motor/generators as well as between said first and second motor/generators;

at least a first planetary gear set;

said first planetary gear set having an inner gear member and an outer gear member, each of which meshingly engage a plurality of planet gear members;

said planet gear members are rotatably mounted on a carrier;

said input shaft is operatively connected to said carrier;

said output shaft being operatively connected to said outer gear member of said first planetary gear set;

a selectively operable torque transfer device interposed in the operative connection between said output shaft and said outer gear member in said first planetary gear set;

said first motor/generator operatively connected to said inner gear member of said first planetary gear set; and, said second motor/generator being in continuous, operative connection to said output shaft.

2. A hybrid transmission, as set forth in claim 1, further comprising:

a second torque transfer device selectively operable to ground said outer gear member of said first planetary gear set.

3. A hybrid transmission, as set forth in claim 2, further comprising:

a second planetary gear set;

said second planetary gear set having an inner gear member and an outer gear member, each of which meshingly engage a plurality of planet gear members;

said planet gear members in said second planetary gear set being rotatably mounted on a carrier;

said outer gear member being grounded;

said inner gear member directly connected by said second motor/generator; and, said output shaft being directly connected by said carrier.

4. A hybrid transmission comprising:

an input shaft to receive power from an engine;

an output shaft;

first and second motor/generators;

energy storage means for accepting power from, and supplying power to, said first and second motor/generators;

control means for regulating power flow between said energy storage means and said motor/generators as well as between said first and second motor/generators;

at least a first planetary gear set;

said first planetary gear set having an inner gear member and an outer gear member, each of which meshingly engage a plurality of planet gear members;

said input shaft is operatively connected to said outer gear member of said first planetary gear set;

a torque transfer device interposed in the operative connection between said input shaft and said outer gear member of said first planetary gear set;

said output shaft being operatively connected to one of the other of said gear members in said first planetary gear set;

said first motor/generator is operatively connected to said inner gear member of said first planetary gear set; and, said second motor/generator being in continuous, operative connection to said output shaft.

5. A hybrid transmission, as set forth in claim 4, further comprising:

a second planetary gear set;

said second planetary gear set having an inner gear member and an outer gear member, each of which meshingly engage a plurality of planet gear members;

said planet gear members in said second planetary gear set being rotatably mounted on a carrier;

said outer gear member of said second planetary gear set being grounded;

said inner gear member of said second planetary gear set being operatively connected to said second motor/generator; and, said output shaft being operatively connected to said carrier.

6. A hybrid transmission comprising:

an input shaft to receive power from an engine;

an output shaft;

first and second motor/generators;

energy storage means for accepting power from, and supplying power to, said first and second motor/generators;

control means for regulating power flow between said energy storage means and said motor/generators as well as between said first and second motor/generators;

at least a first planetary gear set;

said first planetary gear set having an inner gear member and an outer gear member, each of which meshingly engage a plurality of planet gear members;

said planet gear members are rotatably mounted on a carrier;

said output shaft is operatively connected to said carrier said input shaft is operatively connected to said outer gear member of said first planetary gear set;

a selectively operable torque transfer device interposed in the operative connection between said output shaft and said carrier said first motor/generator is operatively connected to said inner gear member of said first planetary gear set; and, said second motor/generator being in continuous, operative connection to said output shaft.

7. A hybrid transmission, as set forth in claim 6, further comprising:

a second torque transfer device selectively operable to ground said carrier.

8. A hybrid transmission, as set forth in claim 7, further comprising:

a second planetary gear set;

said second planetary gear set having an inner gear member and an outer gear member, each of which meshingly engage a plurality of planet gear members;

said planet gear members in said second planetary gear set being rotatably mounted on a carrier;

said outer gear member of said second planetary gear set being grounded;

said inner gear member of said second planetary gear set being operatively connected to said second motor/generator; and, said output shaft being operatively connected to said carrier.

* * * * *